United States Patent [19]
Barsumian et al.

[11] Patent Number: 6,163,259
[45] Date of Patent: Dec. 19, 2000

[54] PULSE TRANSMITTING NON-LINEAR JUNCTION DETECTOR

[75] Inventors: Bruce R. Barsumian; Thomas H. Jones, both of Cookeville, Tenn.

[73] Assignee: Research Electronics International, Cookeville, Tenn.

[21] Appl. No.: 09/326,789

[22] Filed: Jun. 4, 1999

[51] Int. Cl.$^7$ ................................................. G08B 13/14
[52] U.S. Cl. ................... 340/572.2; 340/551; 340/572.1
[58] Field of Search ................. 340/571, 572.1, 340/572.2, 572.4, 572.7, 551, 568.1; 342/28, 46, 21, 193

[56] References Cited

U.S. PATENT DOCUMENTS

| | | | |
|---|---|---|---|
| 3,631,484 | 12/1971 | Augenblick | 342/46 |
| 4,053,891 | 10/1977 | Optiz | 342/193 |
| 4,063,229 | 12/1977 | Welsh et al. | 340/571 |
| 4,123,749 | 10/1978 | Hartmann et al. | 340/572.1 |
| 4,331,957 | 5/1982 | Enander et al. | 342/22 |
| 4,413,254 | 11/1983 | Pinneo et al. | 340/572.6 |
| 4,471,344 | 9/1984 | Williams | 340/572.2 |
| 4,595,915 | 6/1986 | Close | 340/572.2 |
| 4,700,179 | 10/1987 | Fancher | 340/572.1 |
| 5,191,343 | 3/1993 | Danzer et al. | 342/21 |
| 5,414,410 | 5/1995 | Davies et al. | 340/551 |
| 5,990,791 | 11/1999 | Endreasen et al. | 340/572.1 |

OTHER PUBLICATIONS

AUDIOTEL Brochure, SuperBroom and Broom ECM (2 pp.) (undated).
BOOMERANG$^4$ Brochure, Information Security Associates, Inc., 1992.
Operating Instructions Boomerang™ Non–Linear Junction Detector NJD–4, Oct. 1, 1994, Information Security Associates, Inc., 13 pp.
"Hawk" Non–Linear Junction Detector Model 400/B Guidance Manual, 8 pp. (undated).
Locator Pro Non–Linear Junction Detector with Third Harmonic Guidance Manual, International Procurement Services Ltd. Locator Pro, Jul. 24, 1996, 9 pp., London.
Nonlinear Radio Locator NR 900 E (Russian language), 12 pp. (undated).
N.S. Vernigorov, Method of Detection of the Subjects by Nonlinear Radar (Russian language), 6 pp. (undated).
Russian language page containing at the top a 4–column table and at the bottom text and a drawing (undated).

*Primary Examiner*—Van T. Trieu
*Attorney, Agent, or Firm*—Luedeka, Neely & Graham, P.C.

[57] ABSTRACT

A non-linear junction detector designed for counter surveillance measures achieves superior performance by transmitting a series of pulses and receiving harmonics of the transmitted pulse signals that are re-radiated by a non-linear junction such as would be found in an eavesdropping device containing a semiconductor. The transmit power of the series of pulses is varied and the amplitudes of the harmonics received at the different power levels are compared to determine the type of non-linear junction detected. The received harmonic signals are demodulated to create signals having a frequency in the audible range of human ears. The demodulated signals are broadcast so that an operator of the non-linear junction detector can audibly distinguish between the noise responses produced by the different types of non-linear junctions. The harmonic signals are analyzed to determine if the harmonic, signals correspond to signals produced by a known type of non-linear junction device such as a video camera or tape recorder. Data generated by the non-linear junction detector is displayed to an operator of the detector and may be stored for later analysis.

25 Claims, 13 Drawing Sheets

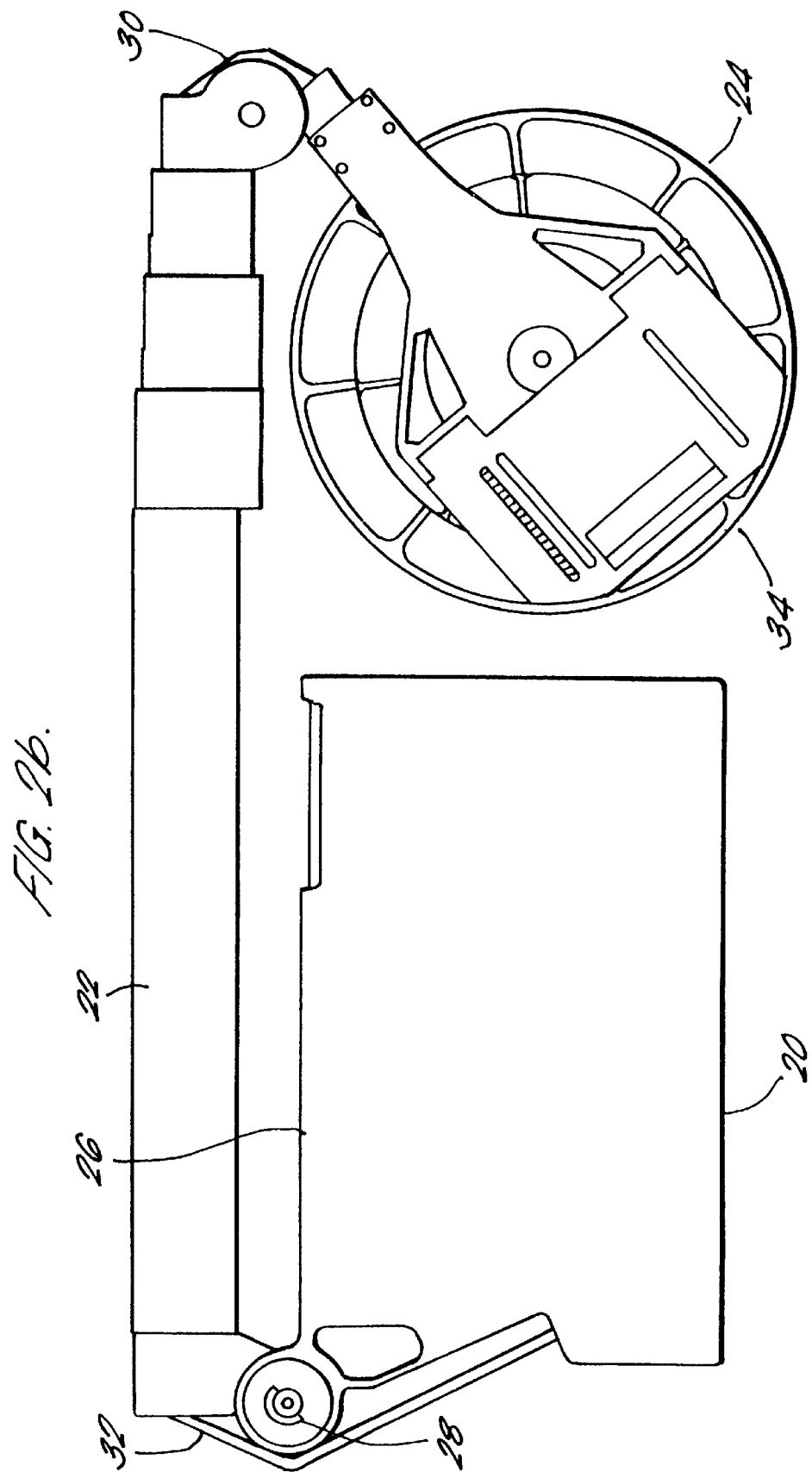

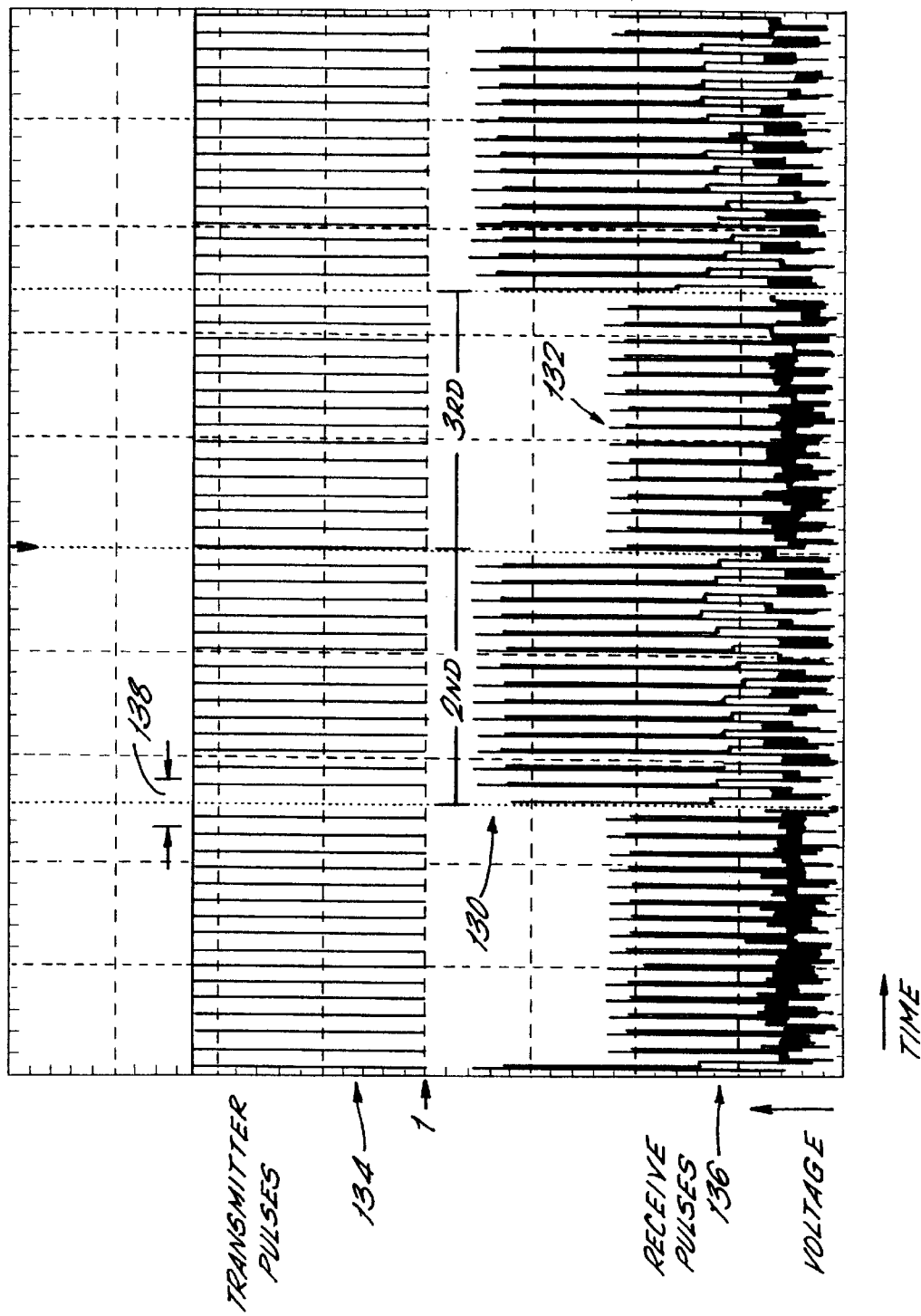

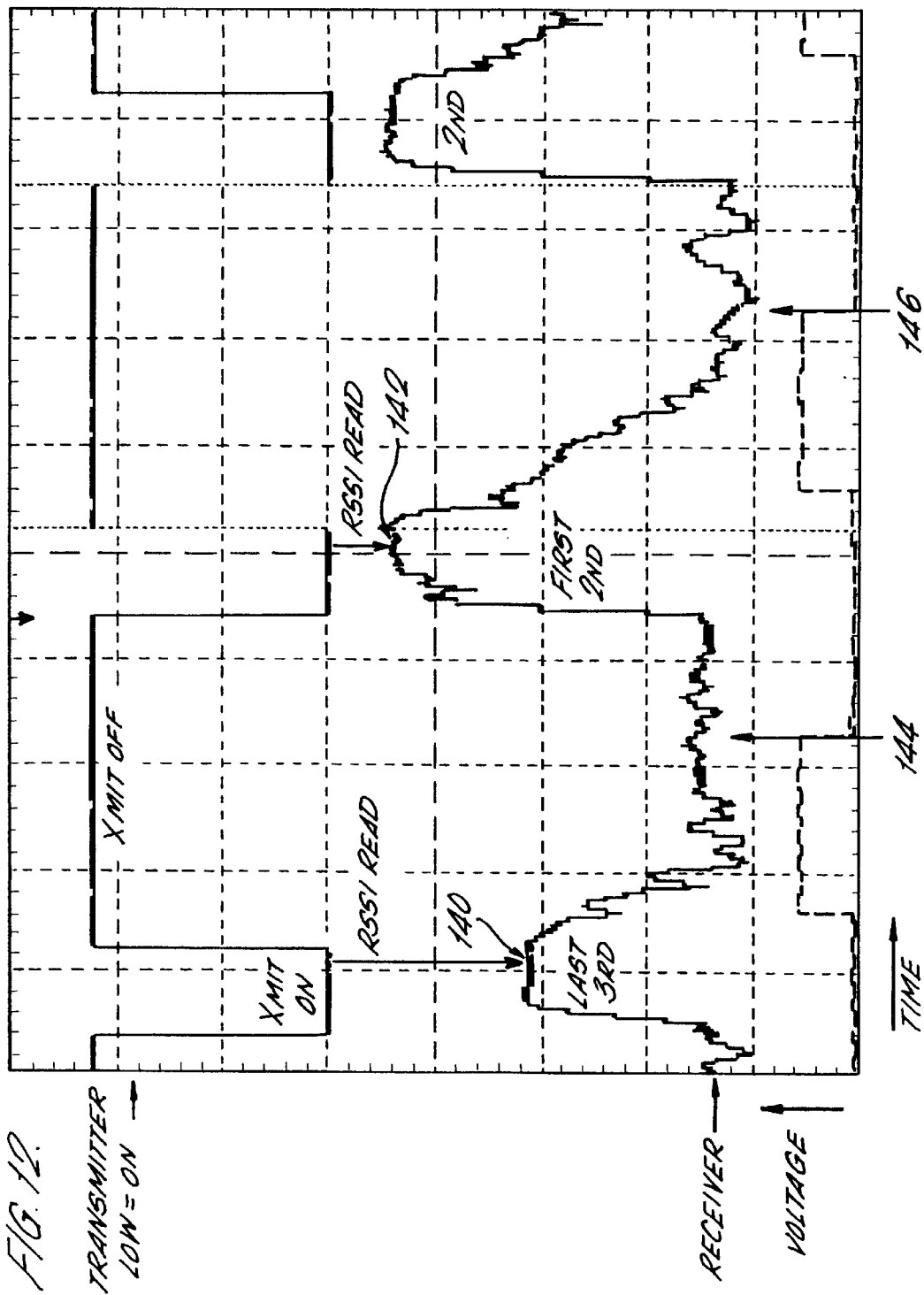

PULSE TRANSMITTING NON-LINEAR JUNCTION DETECTOR

FIELD OF THE INVENTION

The present invention is directed to an apparatus for detecting the presence of non-linear junctions that contain semiconductors. More particularly, the present invention relates to a non-linear junction detector that transmits a series of pulses that cause a non-lineal junction to re-radiate harmonic signals that are digitally sampled and analyzed to determine characteristics of the non-linear junction.

BACKGROUND OF THE INVENTION

A non-linear junction is a junction between different materials for which a change in the voltage applied across the junction does not produce a proportional change in the current flowing through the junction. These non-linear junctions are found in semiconductor components such as diodes, transistors and integrated circuits. However, non-linear junctions also occur naturally and can be detected in rock, building material crystals, and metal/oxide junctions. In particular, non-linear junctions tend to be created by the junctions of dissimilar metals such as the junction between two different types of metals or a metal and its oxidized, corroded surface. These non-linear junctions distort electrical signals that pass through the junction. Subjecting such a non-linear junction to a strong high frequency radio signal causes an electric current to flow through the non-linear junction. The non-linearity in the junction causes a distortion of the originating radio signal thereby generating signals at harmonic frequencies of the incoming signal.

A non-linear junction detector is a device that is used in a fashion similar to a metal detector. However, while a metal detector is designed to detect metal, a non-linear junction detector is designed to detect semiconductor non-linear junctions in electronic devices such as diodes and transistors. A non-linear junction detector works on the principle that by radiating a non-linear junction with sufficiently powerful signals, detectable signals at integral multiples of the frequency of the signal originally radiated on the non-linear junction will be produced and re-radiated by the non-linear junction. Because they occur at harmonic frequencies of the original radiated signal, these re-radiated signals are known as harmonics or harmonic signals. By detecting the presence of these harmonics, the non-linear junction detector can detect the presence of a non-linear junction.

One application that has been devised for non-linear junction detectors is to affix a tag containing a non-linear junction to items in a store that are likely to be shoplifted. A non-linear junction detector is then placed at the exit of the store. When a customer purchases an item, the tag containing the non-linear junction is removed. If the non-linear junction tag is not removed before the item is taken from the store, an alarm will sound when the tag passes through the non-linear junction detector to inform the store's employees that an item is being stolen. Thus, non-linear junction detection technology has been adapted for shoplifting prevention.

Non-linear junction detectors have also been used to detect and locate covert surveillance devices that may be hidden in a room for the purpose of making audio or visual recordings of the activities occurring in the room. These covert surveillance devices contain electronic devices that have non-linear junctions. To locate the surveillance devices, the non-linear junction detector is waved in a sweeping pattern over all the areas in which a surveillance device may be hidden. When the device is waved above a non-linear junction, an alarm notifies the user that a non-linear junction has been detected. One major advantage to using a non-linear junction detector for counter surveillance measures is that it is possible to detect a hidden bugging device even if the device is not turned on and operating.

However, these non-linear junction detectors suffer from several drawbacks. For example, non-linear junction detectors utilize linearly polarized antennas. Using linearly polarized antennas forces the user to scan surfaces in both a horizontal and vertical motion to ensure that a surveillance device is not present with a polarized harmonic return that is perpendicular to the non-linear junction detector's receiver function. The additional time required to scan an area in both a horizontal and vertical fashion results in additional time and money being expended to search an area for surveillance devices.

Current models of non-linear junction detectors generally have a single antenna head that contains at least two antennas. One antenna is for transmitting the original signal and the other is for receiving a re-radiated harmonic of the transmitted signal. If the non-linear junction detector has the capability to receive both the second and third harmonics of the re-radiated signal, then three antennas are utilized, one antenna to receive the second harmonic, one to receive the third harmonic, and one to transmit the original frequency signal. Multiple cables are used to connect these multiple antennas to the transmitter and receivers of the non-linear junction detector. In addition, more cables are needed to support a display on the antenna head that informs the user when a non-linear junction has been detected. These additional cables tend to interfere with the use of the non-linear detector. Furthermore, multiple cables and antennas lead to increased cost and complexity in the non-linear junction detector.

Prior art non-linear junction detectors also produce a transmit signal that has a constant waveform. FCC regulations limit the average output power of the signal transmitted by a non-linear junction detector. This power limitation prevents non-linear junction detectors from increasing their sensitivity by increasing their transmit power level.

Finally, prior art non-linear junction detectors tend to produce an excessive number of false alarms due to the presence of dissimilar metal junctions. This results in an increased amount of time and money needed to search a given area for surveillance devices. Furthermore, because dissimilar metal junctions may occur practically anywhere, the unknown type of non-linear junction may be inside of a wall or under a floor where it is very difficult to determine the type of non-linear junction present without causing damage to the surroundings. Thus, the prior art lacks an effective means for determining the type of nonlinear junction present without having to actually locate the non-linear junction.

Therefore, what is needed is a simple and cost effective non-linear junction detector that has only one antenna. The antenna should be connected to the transceiver electronics of the non-linear junction detector by a single cable in a manner that will not interfere with the operation of the detector. In addition, the antenna of the non-linear junction detector needs to be adjustable to fit in hard to reach places and to conform to the needs of the user and should be able to detect the presence of a non-linear junction device in a single sweep. The non-linear junction detector should be able to discriminate between non-linear junctions occurring in a dissimilar metal oxide junction and a non-linear junction occurring in a semiconductor. Furthermore, the maximum power level of the transmit signal and, thus, the sensitivity of the non-linear junction detector, needs to be increased without exceeding the maximum average power requirement imposed by the FCC.

SUMMARY OF THE INVENTION

The present invention overcomes the deficiencies of the prior art by providing a improved method of detecting the presence of a non-linear junction. The steps of the method include repeatedly transmitting signal pulses at a transmit power level and a frequency. The amplitudes of a second and a third harmonic signal at a second and third harmonic frequency that were re-radiated by at least one non-linear junction in response to the transmitted signal pulses are received and sampled at predetermined intervals to obtain a series of sampled values. A number of the sample values are integrated to obtain an integrated sample value that is displayed. The number of sample values per integration is manually selected by a user or automatically selected by the non-linear junction detector. The transmit power level is automatically adjusted down if the receiver is saturated by the amplitude of either the second or third harmonic signal received in response to the transmitted signal pulses. The transmit power level is automatically adjusted higher if the amplitude of the received harmonic signals is not high enough to begin exciting the receiver. The relative amplitudes of the second and third harmonics received in response to the signal pulses being transmitted at different power levels are compared to determine if the harmonic signals were re-radiated by a non-linear junction of a semiconductor or a non-linear junction created by, for example, two dissimilar metals touching one another or corroded metal. Audio signals representing the amplitude of the second and third harmonic signals are produced to provide a user the ability to audibly discriminate between an audio signal representing a semi-conductor non-linear junction and an audio signal representing the junction of two dissimilar metals. As used herein, "dissimilar metals" refers to corroded metal such as a rusty nail or any other material made up of two touching dissimilar metals, such as galvanized steel. The second and third harmonic frequencies of the second and third harmonic signals are monitored without transmitting a signal pulse to determine if ambient electronic noise above a predetermined level exists at the second and third harmonic frequencies. The frequency of the transmitted signal pulse is altered if it is determined that a undesirably high amount of ambient electrical noise exists at the second and third harmonic frequencies. The frequency of the signal pulses transmitted by the non-linear junction detector is changed to correspond to an allowable operational frequency in the country in which the non-linear junction detector is being used. The transmitted signal pulses are circularly polarized so that the transmitted signal pulses and the received harmonic signals will have the same polarization while any reflections of the transmitted signal pulses will be oppositely polarized. The second and the third harmonic signals are both received with one receiver by toggling the frequency of a local oscillator between a frequency slightly below an intermediate frequency that is between the second and third harmonic frequencies and a frequency slightly above the intermediate frequency to tune a receiver to the second and third harmonic frequencies.

The above described invention improves upon the prior art by providing a non-linear junction detector that uses a series of circularly polarized electromagnetic pulses to detect a non-linear junction. Circular polarization helps the receiver to isolate reflected waves from re-radiated waves because reflected and re-radiated waves have opposite polarizations. In addition, using a pulsed waveform as opposed to a constant amplitude waveform allows the non-linear junction detector to operate at a higher and more effective peak power level. Thus, the present invention is more convenient and cost effective to use than prior art non-linear junction detection devices.

In accordance with yet another preferred method of detecting the presence of a non-linear junction, a transmit signal is transmitted at more than one transmit power level. The amplitudes of a second and a third harmonic signal at a second and third harmonic frequency of the transmit signal that were re-radiated by a non-linear junction are received in response to the transmit signal being transmitted. The amplitudes of the harmonic signals received in response to the transmit signals being transmitted are examined to determine if a non-linear junction has been detected. The relative amplitude levels of the second and third harmonic signals received at the different transmit power levels are compared to discriminate between a non-linear junction formed by two dissimilar metals and a non-linear junction formed in a semiconductor. The received amplitudes of the second and third harmonics and the power level of the transmit signal are displayed. Audio signals representing the amplitude levels of the second and third harmonics are produced to provide a user of the method the ability to audibly discriminate between the sound representing a semi-conductor junction and the sound representing the junction of two dissimilar metals. The given frequency of the transmit signal is changed to correspond to an allowable operational frequency band of the country in which the method of detecting a non-linear junction is being used. The second and the third harmonic signals are alternately received with one receiver by toggling the receiver to alternately tune to the second and third harmonic frequencies for predetermined time periods. Thus, the preferred method improves the prior art by providing additional means for determining the type of non-linear junction detected.

Another preferred method of detecting the presence and type of a non-linear junction includes transmitting a series of pulses at a high frequency, such as an ultrasonic frequency of 20 kHz for example, and listening to the response. While transmitting the high frequency signal pulses, harmonics of the transmitted pulses are received and demodulated into the audible range. The user listens to the demodulated signals to determine the presence or absence of a semiconductor non-linear junction. A dissimilar metal junction will produce a very noisy, multi-frequency, response over multiple audible frequencies, while a semiconductor junction will produce a clean non-noisy response having substantially a single frequency. By listening to the noise level produced by the demodulated harmonic signals, the user can distinguish between semiconductor junctions and dissimilar metal junctions.

Yet another method of detecting a non-linear junction in accordance with the present invention includes transmitting a transmit signal containing a modulated tone. At least one harmonic signal is received in response to the transmitted signal. The at least one harmonic signal is examined to determine if the modulated tone is present in the at least one harmonic signal. If the modulated tone is detected in the at least one harmonic signal, the presence of a non-linear junction is indicated. The method may also include the step of producing an audible signal that represents the at least one harmonic signal such that a user can listen to the audible signal and determine if the modulated tone is present in the at least one harmonic signal. Alternatively, the at least one harmonic signal may be digitally analyzed to determine in the modulated tone is present.

Embodiments of the present invention may also monitor the harmonic frequencies of the transmitted signal without transmitting a transmit signal to determine if any ambient electronic noise exists at the harmonic frequencies. If it is determined that the ambient electrical noise is above a predetermined level at the harmonic frequencies, the frequency of the transmit signal and the corresponding harmonic frequencies of the transmit signal are altered. A non-linear junction detector of the present invention may also select a plurality of possible transmitting frequencies at which a series of signal pulses may be transmitted and calculate the harmonic frequencies corresponding to the plurality of possible transmitting frequencies. The non-linear junction detector then measures the ambient noise level present at each of the calculated harmonic frequencies and configures the non-linear junction detector to transmit the series of signal pulses at the transmitting frequency corresponding to the harmonic frequency having the lowest measured ambient noise level. The measured value of the ambient noise at the harmonic frequency may also be used to calibrate the display such that ambient electrical noise is not included in the displayed signal strength.

Yet another method of detecting the presence of a non-linear junction in accordance with the present invention includes the step of transmitting a transmit signal at a transmit power level and a transmit frequency. In an especially preferred method, the transmit signal consists of a series of signal pulses. In such an embodiment, the series of transmitted signal pulses can be configured to have a duty cycle and an amplitude such that the average power of the transmitted series of pulses is approximately equal to the maximum average transmit power allowed by law for a non-linear junction detector. The series of transmitted signal pulses may also be configured to have a duty cycle and an amplitude that is selected to minimize power consumption and maximize the range at which a non-linear junction can be detected. Furthermore, the frequency of the transmitted signal pulses may be altered to correspond to an allowable operational frequency band of the country in which the method of detecting non-linear junctions is being practiced. It is further envisioned that the transmit signal may be circularly polarized to have the same polarization as the re-radiated harmonic signal and the opposite polarization of reflected components of the transmit signal.

Regardless of the transmit signal utilized, the at least one harmonic signal that is re-radiated by a non-linear junction at a harmonic frequency of the transmitted signal is received and sampled with an analog-to-digital converter to produce a sampled value. The sampled value is examined to determine if a non-linear junction is present. The step of sampling the at least one harmonic signal may also include sampling the at least one harmonic signal at predetermined intervals to obtain a series of sampled values. The transmit power level is automatically adjusted lower if the amplitude of the at least one harmonic signal received in response to the transmit signal exceeds a predetermined allowable level and the transmit power level is automatically adjusted higher if the amplitude of the at least one harmonic signal received in response to the transmit signal is below a predetermined allowable level. The harmonic frequency of the at least one harmonic signal may be monitored without transmitting a transmit signal to determine if any ambient electronic noise exists at that harmonic frequency and the frequency of the transmit signal may be altered if it is determined that the ambient electrical noise is above a predetermined level at the at least one harmonic frequency. Furthermore, a desirable transmit and receive frequency may be located by selecting a plurality of possible transmitting frequencies at which the transmit signal may be transmitted, calculating harmonic frequencies corresponding to the plurality of possible transmitting frequencies, measuring an ambient noise level present at each of the calculated harmonic frequencies, and configuring the non-linear junction detector to transmit the transmit signal at the transmitting frequency corresponding to the harmonic frequency having the lowest measured ambient noise level. In addition, when a non-linear junction is detected, the transmit power level of the transmit signal may be increased and decreased and the change in amplitude of the received at least one harmonic signal is compared to the change in the transmit power level to determine if the detected non-linear junction is a semi-conductor or dissimilar metal non-linear junction.

Sampling the received harmonic signal allows a variety of digital signal analysis techniques to be employed to analyze the received harmonic to determine the nature of the non linear junction that is re-radiating the transmitted signal. In addition, digitizing the data permits easy storage of the data for manipulation and analysis at a later date. Therefore, a non-linear junction detector which produces digital data is a substantial improvement over the prior art.

The step of receiving at least one harmonic signal may include receiving at least a second and a third harmonic signal and producing audio signals representing amplitude levels of the second and third harmonics to provide a user of the method the ability to audibly discriminate between a sound representing a semi-conductor junction and a sound representing a junction of two dissimilar metals. Furthermore, the step of receiving the at least one harmonic signal that was re-radiated by a non-linear junction at a harmonic frequency of the transmitted signal may also include using a single receiver that alternates between receiving at least a second harmonic signal and a third harmonic signal. In accordance with yet another particular embodiment of the present method, the at least one harmonic signal is analyzed to produce digital data and the digital data is compared to stored digital data derived from known types of devices containing non-linear junctions to classify the type of device being detected.

The signal strength of the received harmonic signal is displayed on a display and the display is calibrated such that ambient electrical noise is not included in the displayed signal strength. To improve the readability of the display, a number of sampled values may be integrated to obtain an integrated sample value and the integrated sample value displayed. The number of sample values per integration may be manually selected by a user or automatically selected by the non-linear junction detector. The presence of the re-radiated harmonic signal may also only be indicated when an amplitude of the re-radiated harmonic signal exceeds a user selectable threshold level.

The present invention further comprehends a method of detecting a non-linear junction that includes transmitting a transmit signal containing a modulated tone. At least one harmonic signal is received in response to the transmitted signal. The at least one harmonic signal is examined to determine if the modulated tone is present in the at least one harmonic signal. Preferably, the step of examining the at least one harmonic signal further includes the step of digitally analyzing the at least one harmonic signal to determine if the modulated tone is present. The presence of a non-linear junction is indicated if the modulated tone is detected in the at least one harmonic signal. In an alternate embodiment, the step of indicating the presence of a non-linear junction further includes the step of producing an audible signal that represents the at least one harmonic signal such that a user can listen to the audible signal and determine if the modulated tone is present in the at least one harmonic signal.

Yet another method in accordance with the present invention of detecting the presence of a non-linear junction includes the step of transmitting a transmit signal at more than one transmit power level. The amplitude of at least a second and a third harmonic signal at a second and third harmonic frequency of the transmit signal is received that were re-radiated in response to the transmit signal being transmitted. The amplitudes of the harmonic signals received in response to the transmit signals being transmitted are examined to determine if a non-linear junction has been detected and the relative amplitude levels of the second and third harmonic signals received at the different transmit power levels are compared to discriminate between a non-linear junction formed by two dissimilar metals and a non-linear junction formed in a semiconductor. The above discussed method further envisions comparing time and frequency domain waveforms of the harmonic signals re-radiated by a non-linear junction to time and frequency domain waveforms re-radiated by non-linear junctions in known types of electronic devices to determine if the harmonic signals were re-radiated by a non-linear junction in a known type of electronic device.

The present invention further comprehends a method of detecting the presence of a non-linear junction wherein a first transmit signal having a first frequency is transmitted. First harmonic signals at harmonic frequencies of the first transmit signal are received. A second transmit signal having a second frequency is transmitted and second harmonic signals at harmonic frequencies of the second transmit signal are received. At least one of the first and the second harmonic signals is examined to determine if a non-linear junction is present.

As can be seen from the previous discussion, the present invention provides an array of improvements over the prior art. Yet other objects and advantages of the invention will be apparent from the following description, the accompanying drawings and the appended claims.

BRIEF DESCRIPTION OF THE DRAWINGS

Further advantages of the invention will become apparent by reference to the detailed description of preferred embodiments when considered in conjunction with the following drawings wherein:

FIG. 2b is a visual representation of an embodiment of the improved non-linear junction detector in its stored configuration;

FIG. 11 is a timing chart showing the transmitted and received pulses; and

FIG. 12 is a blown up view of a region of the timing chart of FIG. 11.

DETAILED DESCRIPTION OF THE PREFERRED EMBODIMENTS

Figure 1:
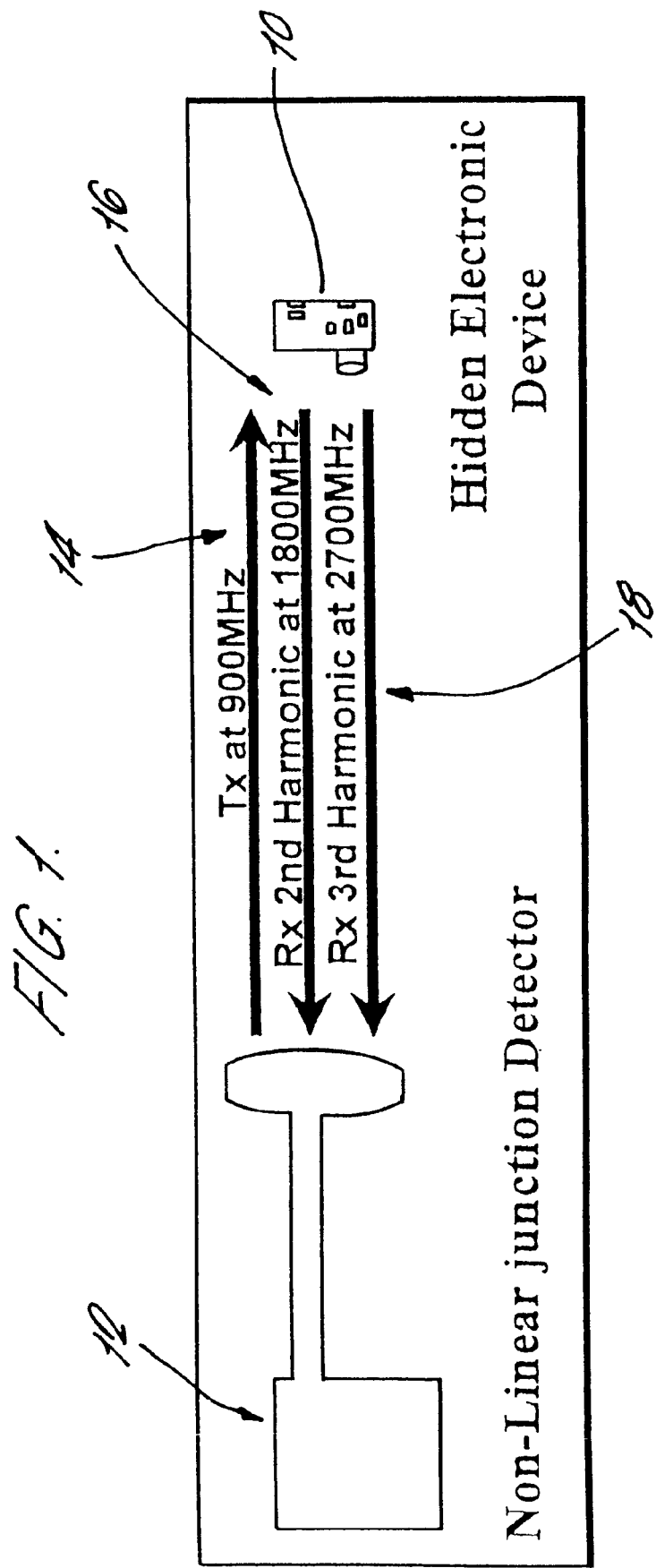
FIG. 1 is a functional diagram of the operation of a non-linear junction detector.

As previously discussed, a non-linear junction detector works on the principle that by radiating a non-linear junction with electromagnetic waves of sufficient power, detectable harmonics will be produced and re-radiated by the non-linear junction at frequencies that are integral multiples of the transmitted frequency. An example of how this principle would be used to detect the presence of a hidden electronic device 10 is shown in FIG. 1. In the example shown in FIG. 1, the non-linear junction detector 12 is transmitting electromagnetic radio waves 14 at a frequency of 900 Mega hertz (MHZ). The non-linear junctions found in the semi-conductors used to construct the hidden electronic device 10 re-radiate second 16 and third 18 harmonic signals at the second and third harmonic frequencies of the transmitted radio waves 14. Thus, these harmonic signals 16 and 18 have a frequency that is equal to two and three times the frequency of the transmitted signal 14 respectively. The receivers of the non-linear junction detector 12 are tuned to receive signals in these harmonic frequency ranges. Thus, by detecting the presence of harmonic signals re-radiated by non-linear junctions, the non-linear junction detector 12 can detect the presence of a hidden electronic device 10.

Many non-linear junctions occur outside of electronic devices. For example, whenever two dissimilar metals are touching each other, a non-linear junction is formed. Because these non-linear junctions are not indicative of an electronic device, it is extremely beneficial to be able to distinguish between the harmonics re-radiated by a non-linear junction formed by a dissimilar metal junction and those re-radiated by a semiconductor non-linear junction found in an electronic device. An especially preferred embodiment of the present invention distinguishes between the two types of non-linear junctions by examining and comparing the amplitudes of the second and third harmonic signals. A semi-conductor non-linear junction re-radiates relatively strong second harmonics and relatively weak third harmonics. In fact, a dissimilar metal non-linear junction will tend to re-radiate much stronger signals at the third harmonic frequency than at the second harmonic frequency. Thus, by comparing the amplitude of the re-radiated second harmonic signal to the amplitude of the re-radiated third harmonic signal, the present invention can discriminate between the different types of non-linear junctions.

Figure 2A:
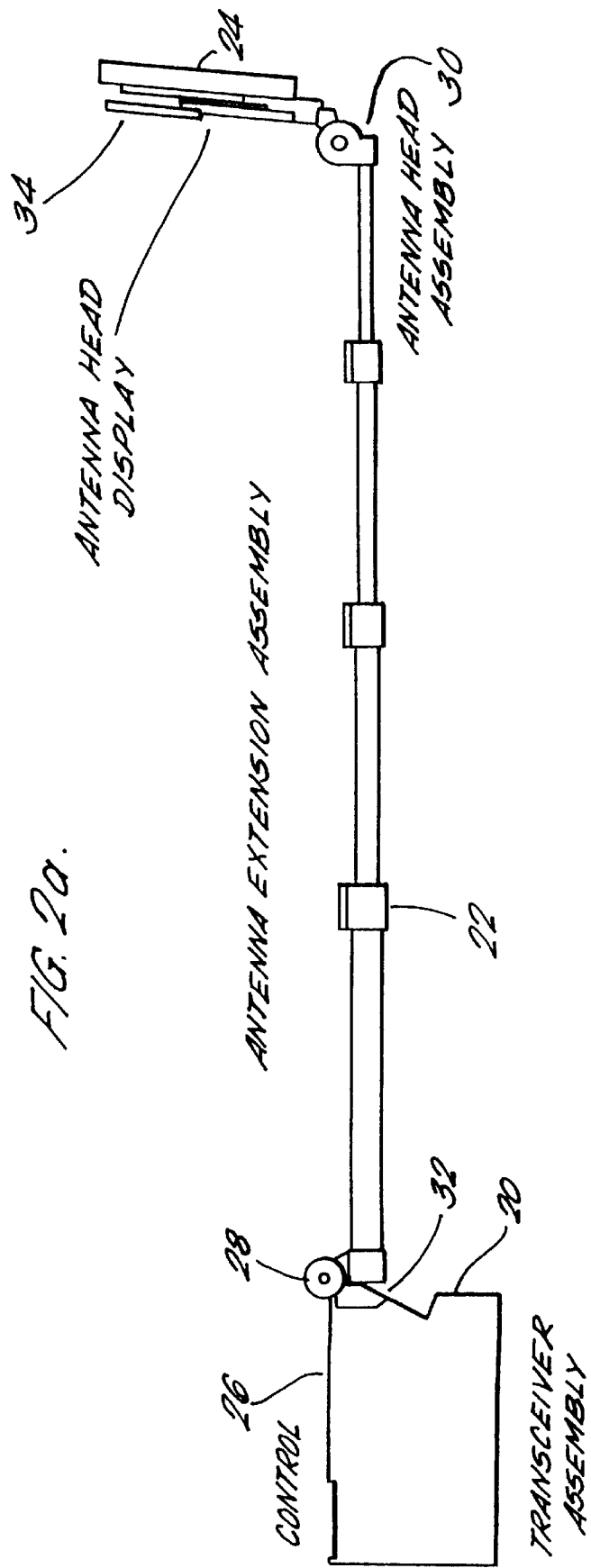
FIG. 2a is a visual representation of an embodiment of the improved non-linear junction detector in its operational configuration.
Figure 5:
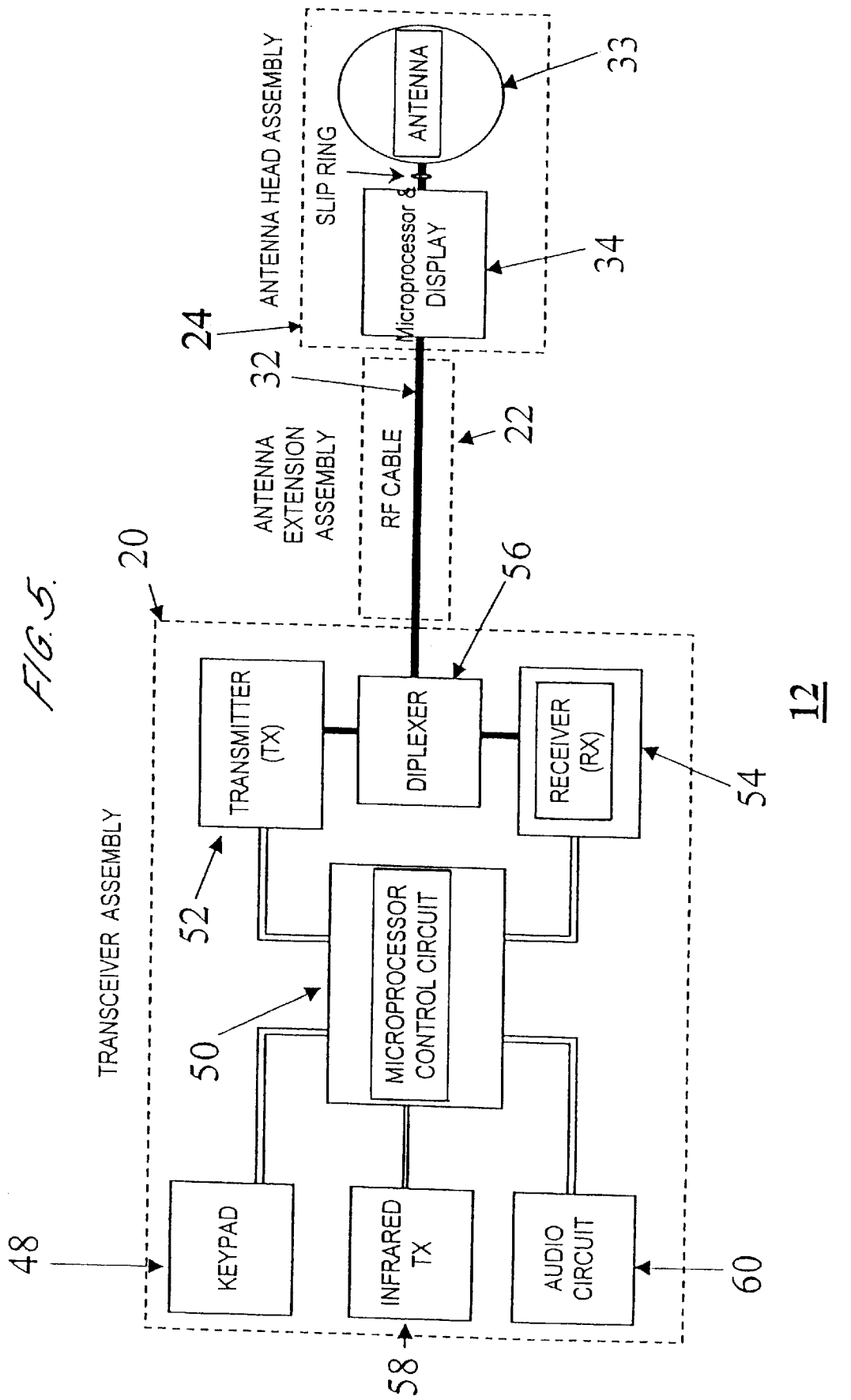
FIG. 5 is a block diagram of a preferred embodiment of the present invention.

FIG. 2a shows an especially preferred embodiment of the present invention. Basically, the nonlinear junction detector 12 consists of a transceiver case 20, an extendable and retractable antenna extension assembly 22 and an antenna head assembly 24. The transceiver case 20 houses most of the electronic circuitry needed to implement the non-linear junction detector 12. Among other things, this electronic circuitry includes a transmitter 52, a receiver 54 and a microprocessor control circuit 50 as shown in FIG. 5. The transceiver case 20 also supports all the electrical connections and shielding requirements needed for the circuitry of the non-linear junction detector 12. Control buttons or switches 26 are provided on the transceiver case 20 to allow the user of the non-linear junction detector 12 to control its operation. The transceiver case 20 is rotatably connected to the extendable and retractable antenna extension assembly 22 by means of a connection joint 28. This connection joint 28 is designed to rest in two basic positions, the open position which is the normal operational position in which the transceiver case 20 is extended along the same axis as the antenna extension assembly 22, as shown in FIG. 2a, and the closed storage position in which the transceiver case 20 is folded so that the transceiver case 20 is parallel to the antenna extension assembly 22, as shown in FIG. 2b. The connection joint 28 is made up of a detent assembly so that at the two basic positions the connection joint 28 locks in place. To change the position of the connection joint 28, sufficient force must be exerted to overcome the detent ball and socket system.

An antenna head assembly connection joint 30 provides the mechanical interface between the antenna head assembly 24 and the extendable and retractable antenna extension assembly 22. The antenna head assembly connection joint 30 preferably provides dual axis of rotation for the antenna head assembly 24. The dual axis of rotation capability allows the antenna head assembly 24 to be rotated to fit in hard to reach places or around difficult corners. Furthermore, the antenna head assembly connection joint 30 is constructed so that it allows the electrically conductive cable 32 that provides an electrical interface between the electrical components of the transceiver case 20 and the antenna head assembly 24 to move into and out of the antenna head assembly 24 when extending and collapsing the antenna extension assembly 22. Preferably, the antenna head assembly 24 consists of an antenna 33 with a built in cord winder. The cord winder provides the mechanical function of winding the electrically conductive cable 32 into the cord winder when the antenna extension assembly 22 is collapsed and dispensing the cable 32 from the cord winder when the antenna extension assembly 22 is extended. When the antenna extension assembly 22 is retracted or extended, the antenna head assembly 24 of a preferred embodiment rotates as the cord winder either collects or dispenses the electrically conductive cable 32. As discussed in more detail later with regards to FIG. 9, a slip ring assembly 108 is used to extract the electronic inputs for the antenna head display 34. The contacts for the slip ring 108 are fixed to the antenna head display 34 circuitry while the slip ring 108 is connected to the cord winder. Thus, electrical contact between the antenna head assembly 24 electronics and the electrically conductive cable 30 is maintained as the antenna head assembly 24 rotates.

Figure 3:
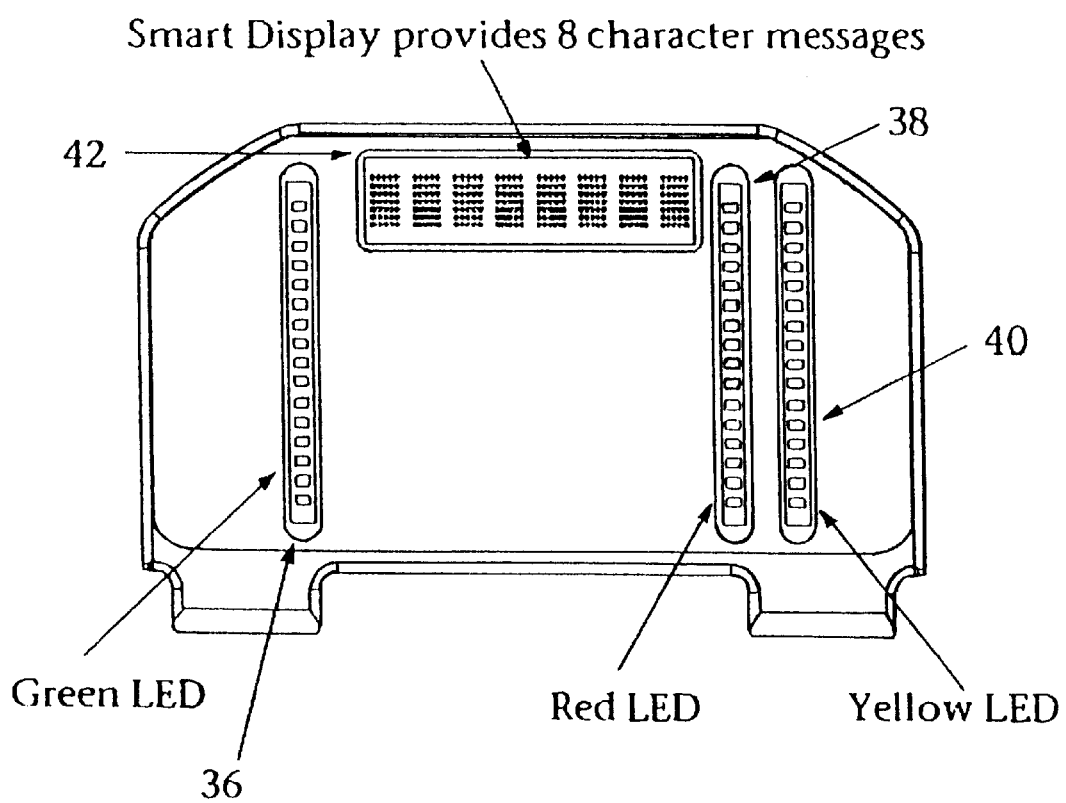
FIG. 3 is a visual representation of a preferred antenna head assembly display.

The antenna head assembly 24 has an antenna head display 34 that provides information to a user of the non-linear junction detector 12 concerning the presence of any non-linear junctions. A close up and detailed view of the antenna head display 34 is depicted in FIG. 3. The antenna display 34 preferably has three light emitting diode (LED) bar graphs 36, 38 and 40 and an eight character alphanumeric display 42. The LED bar graphs 36, 38 and 40 graphically display the strength of the second harmonic return signal 38, the strength of the third harmonic return signal 40, and the strength of the transmitted signal 36. In an especially preferred embodiment, the transmit power display 36 flashes a bar which represents a maximum transmit power level which was selected by the user when the actual transmitted power level is automatically adjusted lower as discussed in more detail below. However, it is understood that the invention is not limited to the particular antenna display 34 configuration discussed. Furthermore, it is understood that embodiments of the invention might place the display 34 in other locations, such as on the transceiver case 20.

Figure 4:
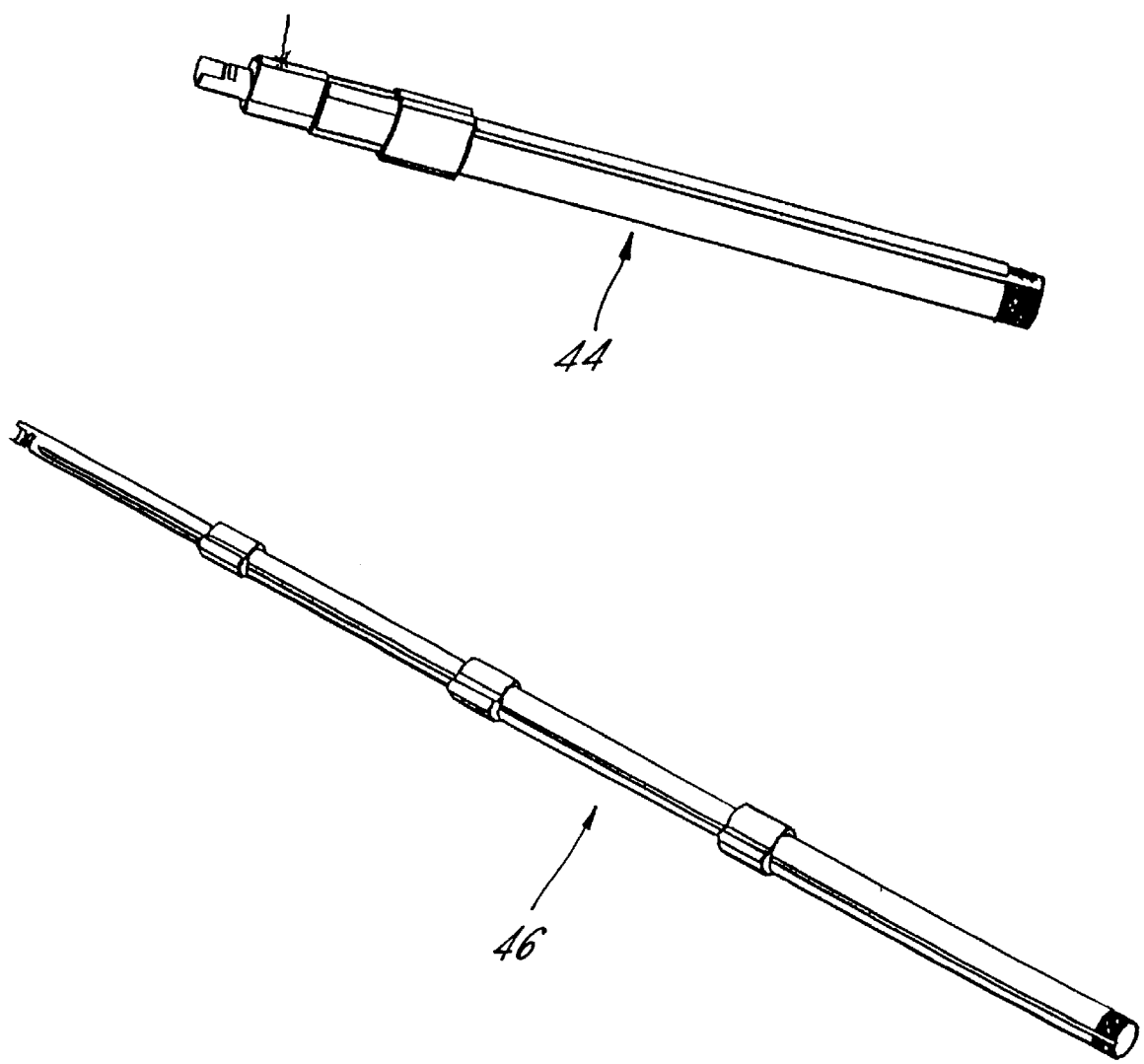
FIG. 4 is a visual representation of an antenna head extension assembly retracted and extended.

The antenna extension assembly 22 is shown as a retracted assembly 44 and extended assembly 46 in FIG. 4. The antenna extension assembly 22 consists of a telescoping pole which has the transceiver case assembly connection joint 28 on one end and the antenna head assembly connection joint 30 on the other end. The telescoping extension assembly 22 is preferably hollow inside and houses the electrically conductive cable 26 that connects the electronics contained in the transceiver case 20 to the electronics contained in the antenna head assembly 24. When fully collapsed, in one embodiment the antenna extension 22 is 17 inches long and, when fully extended, the antenna extension 22 is 54 inches long. However, it is readily appreciated that the antenna extension 22 could be designed in a variety of sizes.

As shown in FIG. 5, a preferred embodiment of the non-linear junction detector 12 conceptually consists of three main assemblies: the transceiver case assembly 20, the antenna extension assembly 22, and the antenna head assembly 24. Block diagrams can be used to represent the components and functioning of these assemblies 20, 22 and 24. The transceiver case assembly 20 preferably houses a key pad 48 that allows the user to enter various commands that control the functioning of the non-linear junction detector 12. Other types of user interfaces such as dials or switches are within the scope of the present invention, however, a key pad 48 is preferred.

The commands entered on the key pad 48 are sent to the microprocessor control circuit 50. A preferred microprocessor for use in the microprocessor control circuit 50 is a mc68hc711e9 manufactured by Motorola and other manufacturers. However, it is understood that a wide variety of microprocessors could be used to implement the microprocessor control circuit 50. When the non-linear junction detector 12 is turned on and the proper operational mode is initiated, the microprocessor control circuit 50 performs calibration procedures such as calibrating the sensitivity levels, searching for the quietest receive frequencies for operation, and calibrating the display bar graphs to the proper noise level as discussed in more detail below. Once the calibration procedures are completed, the microprocessor control circuit 50 prompts the transmitter 52 to begin transmitting signals. These signals are carried by the electrically conductive cable 32 housed in the antenna extension assembly 22 to the antenna 33 where they are broadcast. Harmonic signals that are re-radiated from a non-linear junction in response to the transmitted signals are then received by the antenna 33. These harmonic signals are carried by the electrically conductive cable 32 to the diplexer 56. The diplexer 56 allows the relatively high frequency harmonic signals to enter the receiver 54 while preventing the relatively low frequency transmitted signals from entering the receiver 54.

The receiver 54 produces a received signal strength indicator signal and demodulates received audio signals from the received harmonic signals 16 or 18. These signals are sent to the microprocessor control circuit 50. The microprocessor control circuit 50 processes the received signal strength indicator signal and sends the appropriate commands to the antenna head display 34 to direct the display 34 to display the strength of the received signals. The microprocessor control circuit 50 sends the demodulated audio signals to an audio circuit 60 and an infrared transmitter 58 that is preferably in communication with a pair of cordless infrared headphones. Alternatively, the microprocessor control circuit 50 may synthesize a tone based upon the received signal strength indicator signal level. The sounds produced by the audio circuit 60 and the headphones allow the user to audibly detect the presence of a non-linear junction. The audio tones provide the advantage of faster response time and greater resolution than can be provided by the bar graph alone. While infrared headphones are the preferred way to provide the audible signals to an operator of the non-linear junction detector 12, it is understood that a variety of different speakers and headphones could be used to broadcast the audio signals.

In one especially preferred embodiment, the audio output at least consists of two different audio tone signals. Each audio tone corresponds to the signal strength of either the second 16 or third harmonic signal 18. Thus, listening to the audio signals provides the user of the non-linear junction detector 12 a relative indication of the strength of the second and third harmonic receive levels. This is beneficial because, as previously discussed, semi-conductor non-linear junctions can be distinguished from dissimilar metal non-linear junctions by examining the amplitudes of the second and third harmonics. This feature can be further augmented by differentiating between a stronger second harmonic and a stronger third harmonic by changing the sound of the tone. When the second harmonic is stronger, the tone presented is a pure pitch based on the second harmonic signal only. However, when the third harmonic becomes stronger, the tone alternates between pitches determined by the second harmonic and third harmonic strengths. This distinctive high-speed dual tone immediately indicates to the user the presence of a third harmonic. As discussed above, being able to audibly discern whether a target is radiating second or third harmonics greatly simplifies the use of the non-linear junction detector 12. In addition, the user may set a threshold level at which the non-linear junction detector will indicate the presence of a harmonic signal. If the harmonic signal does not have an amplitude that is above this threshold, the sound is muted and the presence of a non-linear junction is not indicated.

In another preferred embodiment, the non-linear junction detector 12 may rely on demodulated audio noise as a method of discriminating between semi-conductor and dissimilar metal non-linear junctions. The received harmonic signals 16 and 18 are demodulated using normal audio demodulation techniques such as AM or FM demodulation. The harmonic signals re-radiated by a semi-conductor junction contain very little audio noise because the signals are pure harmonic reflections of the transmitted signal. Thus, the operator will hear little if any noise if the harmonic signals from a semi-conductor non-linear junction are audibly reproduced. However, the harmonic signals produced by a dissimilar metal junction tend to contain more audio noise than those of a semi-conductor non-linear junction. Furthermore, by increasing the power and pulsing the transmit signal the non-linear junction of a dissimilar or corrosive metal junction may be disrupted so that the non-linearity is not observed. However, semi-conductor non-linear junctions are able to withstand much higher power levels before the non-linearity of the junction is overcome. Thus, if the harmonic signals produced by a dissimilar, corrosive metal junction are demodulated, relatively large amounts of audio noise will be present as compared to a semi-conductor nonlinear junction. Thus, an operator of the non-linear junction detector 12 will hear a much louder audible noise response if a dissimilar metal non-linear junction re-radiated the harmonic signals than if a semi-conductor non-linear junction re-radiated the harmonic signals. In a preferred embodiment, the non-linear junction detector uses a pulsing approach to perform the demodulation of the listening mode. This preferred embodiment transmits pulses at a 20 KHz pulse rate and a duty cycle such that the FCC radiated power levels are not exceeded. Since the 20 KHz pulse rate is above normal hearing frequencies, the audio can be easily demodulated using normal AM demodulation techniques. It is understood that a variety of different methods may be used to perform the demodulation of the received signal.

One of the signal identification techniques used with the invention may involve comparing the received harmonic signals 16 and 18 to known representations of harmonic signals 16 and 18 that were re-radiated from known types of electronic devices. For example, certain types of electronic devices 10 re-radiate harmonic signals 16 and 18 that contain distinctive variations in the originally transmitted signal 14. When harmonic signals 16 and 18 are received, the harmonic signals 16 and 18 are demodulated to isolate the variations in the harmonic signals 16 and 18 from the originally transmitted signal 14. If these demodulated signals are examined, the type of device re-radiating the harmonics may be dissemble. The demodulated signals re-radiated from operating video cameras will typically contain clocking or synchronization pulses associated with video processing. The presence of such synchronization pulses suggests detection of a video camera. By closely examining the frequency of the synchronization pulses, it is even possible to distinguish between cameras using different types of video recording formats.

In the event that the clocking frequencies or audio frequencies are above audible hearing frequencies, it is possible to downconvert the received audio by using a pulsed transmit signal operating at ultra-sonic or higher frequencies. Downconverting with the high frequency pulsed transmit signal results in intermodulation or downconversion of the high frequency signal into the audible frequency range.

The demodulated signals discussed above can also be sent directly to the headphones or audio circuit 60 of the non-linear junction detector 12 to allow the operator to audibly distinguish between the different types of devices. Different types of electronic devices almost invariably produce distinctive sound patterns when demodulated as discussed above. For example, the signals re-radiated from audio recording devices are often extremely distinctive. If an audio recording device is operating, sending the demodulated signals re-radiated from the device directly to headphones or audio circuit 60 of the non-linear junction detector 12 may allow the user of the non-linear junction detector 12 to actually listen to the audio signals from the recording device and hear exactly what the device is recording. However, even if the actual audio signal from the audio recorder can not be received, a trained user may learn to recognize the audio patterns created by particular types of electronic devices.

Yet another means of discriminating between different types of non-linear junctions, and thus reducing the number of false alarms, involves varying the power of the transmitted signal 14 and examining the change in the amplitudes of the received harmonic signals 16 and 18 in response to the change in the amplitude of the transmitted signal 14. The transmitter 52 output power level can be altered by using the microprocessor control circuit 50 to vary the gain of the power amplifier 74. The change in amplitude in the received harmonic signals 16 and 18 can be examined digitally with the microprocessor control circuit 50, audibly with the infrared transmitter 58 and the audio circuit 60, or visually through use of a graphical display 34. In effect, varying the transmitter 52 power level allows a user of the non-linear junction detector 12 to examine the non-linear response of the non-linear junctions. Non-linear junctions, such as those found in electronic devices such as a diode, tend to have non-linear responses that occur at constant and predictable transmitted signal 14 power levels. By repeatedly increasing the power of the transmitted signal 14, a user will notice a strong increase in the amplitude of the re-radiated harmonic signals 16 and 18 every time the power of the transmitted signal 14 exceeds a certain level. This type of amplitude response is indicative of a semi-conductor non-linear junction. However, dissimilar metal junctions have non-linear responses that tend to be unpredictable and vary a great deal. Thus, if the amplitude of the received harmonic signals 16 and 18 tends to vary unpredictably and the variations tend to occur at different transmit power levels when the transmit power is repeatedly increased and decreased, the non-linear junction is more than likely caused by a dissimilar metal junction. As previously stated, the non-linear responses created by the non-linear junctions can be provided to the operator of the non-linear junction detector 12 in a variety of ways including visually and graphically displaying them on a display, or audibly representing the amplitude of the signals through headphones or an audio circuit 60.

Figure 6:
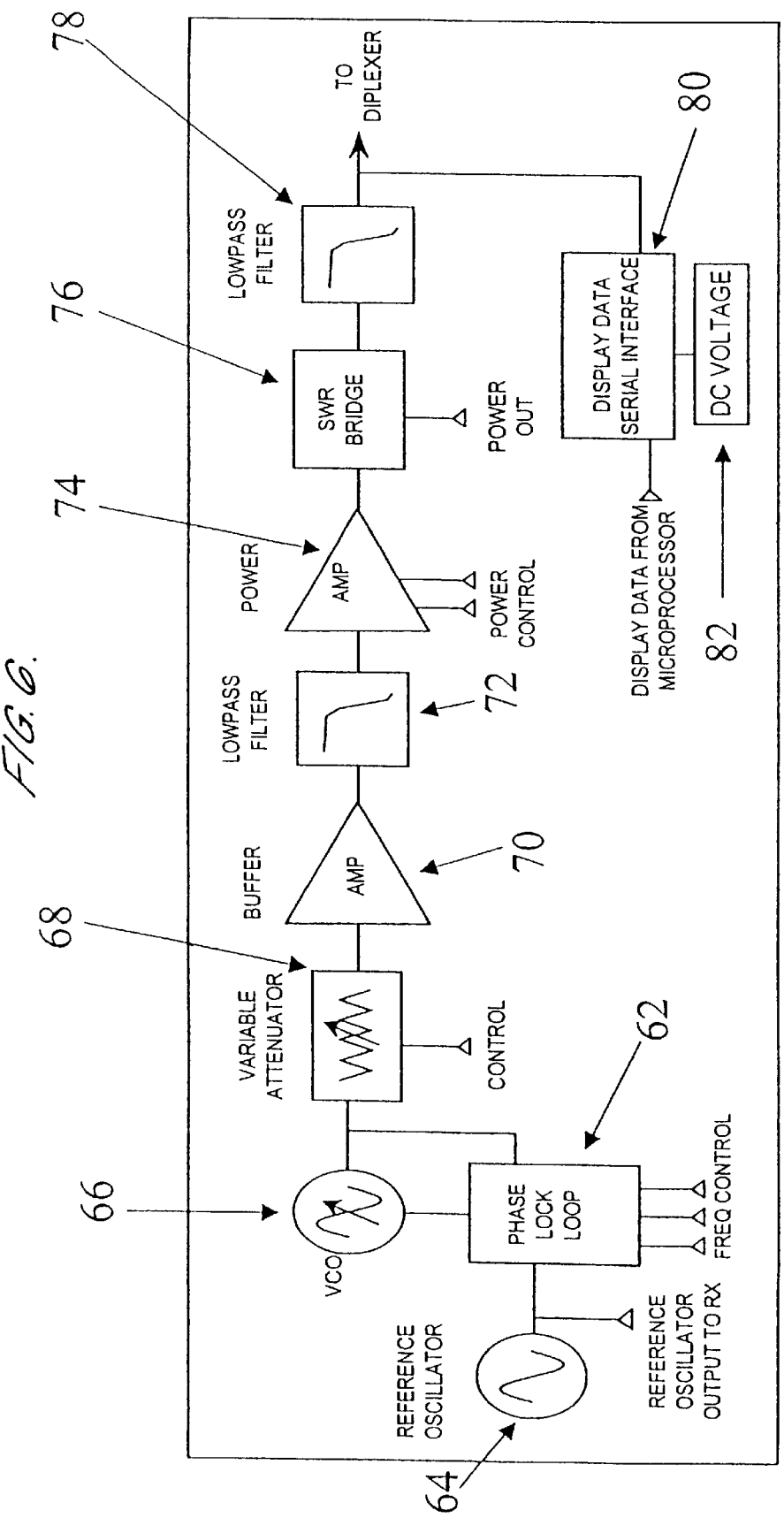
FIG. 6 is a block diagram of a preferred transmitter.

The transmitter 52 produces the transmit signals 14 which are broadcast by the antenna head assembly 24. A block diagram of the internal functioning of a preferred transmitter 52 is depicted in FIG. 6. The transmitter 52 contains a phase locked loop frequency synthesizer 62 which generates the fundamental transmit frequency. A reference oscillator 64 provides a reference frequency to the phase locked loop 62. The reference oscillator 64 is also used as a reference oscillator 64 for the receiver 50. The reference oscillator 64 in his particular embodiment has a frequency of 6.4 MHZ but other frequencies could be used. A voltage controlled oscillator 66 provides the transmit signal 14 to the phase locked loop 62. The voltage controlled oscillator 66 and the phased locked loop 62 are controlled by control signals provided from the microprocessor control circuit 50. Prior to amplification, the transmit signal's amplitude is controlled by a variable attenuator 68 which also receives control signals from the microprocessor control circuit 50. The output from the variable attenuator 68 is buffered by an amplifier 70 and then passed through a low pass filter 72 to remove any high frequency components generated by the transmitter 52. After passing through the low pass filter 72, the signal is amplified by a power amplifier 74 which preferably provides an output power level of either 1 milliwatt, 10 milliwatts, 100 milliwatts, or 1 watt depending on the control signals received from the microprocessor control circuit 50. The output signal from the power amplifier 74 is sent to a single wave rectifier bridge 76 which provides an output power level to the microprocessor control circuit 50. The microprocessor control circuit 50 processes the output power level signal and sends commands to the antenna head display 34 to provide an output power level indication to the user of the non-linear junction detector 12. The signal from the single-phase wave rectifier bridge 76 is then passed through another low pass filter 78. As previously discussed, low pass filtering the transmit signal prevents high frequency harmonics of the transmitted signal from entering the antenna head assembly 24 and interfering with the reception of the re-radiated harmonic signals 16 and 18. After passing through the final low pass filter 78, an amplitude modulated signal containing the display data for the antenna head display 34 from the microprocessor control circuit 50 is added to the transmitter output by a serial interface 80. Finally, a DC voltage 82 that is the power supply for the antenna head display 34 is added to the transmitted signal and the display data and sent to the antenna head display 34.

Current non-linear junction detectors transmit a signal having a relatively constant power level. However, in accordance with the present invention, the transmitter 52 is designed to provide a pulsing transmit function and a constant wave transmit function as well as variable power level control. In one embodiment, the transmit waveform has a 7.5% duty cycle, but other duty cycles can be used. This means that the transmit signal is at a predetermined power level for 7.5% of the time and is turned off for the other 92.5% of the time. In this embodiment, this translates into a 1.5 msec transmit pulse during which the power amplifier 74 is enabled followed by 18.5 msec time period during which the power amplifier 74 is disabled and, consequently, no transmit pulse at all is produced. This is very beneficial in that FCC requirements state that a non-linear junction detector can produce a maximum average output power. Thus, if the non-linear junction detector 12 produces a transmit signal 14 that has a constant power, the maximum power level of the signal can not exceed the allowable limit. However, if the transmit signal 14 only has a duty cycle of 10%, the power of the transmit signal 14 during its duty cycle can be 10 times the allowable maximum transmit power level. Thus, pulsing the transmitter 52 allows the non-linear junction detector 12 to produce a more powerful and effective transmit signal 14 while still remaining in compliance with the requirements imposed by law. Furthermore, since the transmitted and received signals are preferably only sampled during the transmit pulse and the pulses are generated relatively rapidly, the non-linear junction detector appears to be operating continuously, when in reality the non-linear junction detector 12 is pulsing with a greatly reduced average output power. In addition, non-linear junction detectors are typically powered by an internal power supply that allows the non-linear junction detector 12 to be portable. Pulsing the transmitter 52 allows the non-linear junction detector 12 to enjoy the benefits of a high powered transmit signal 14 without increasing the power consumption of the non-linear junction detector 12. It is appreciated that there are an infinite number of different pulse widths and duty cycles that could be chosen that would provide the benefits of increased maximum power and decreased power consumption and the present invention is not limited to any particular pulse width or duty cycle.

Figure 7:
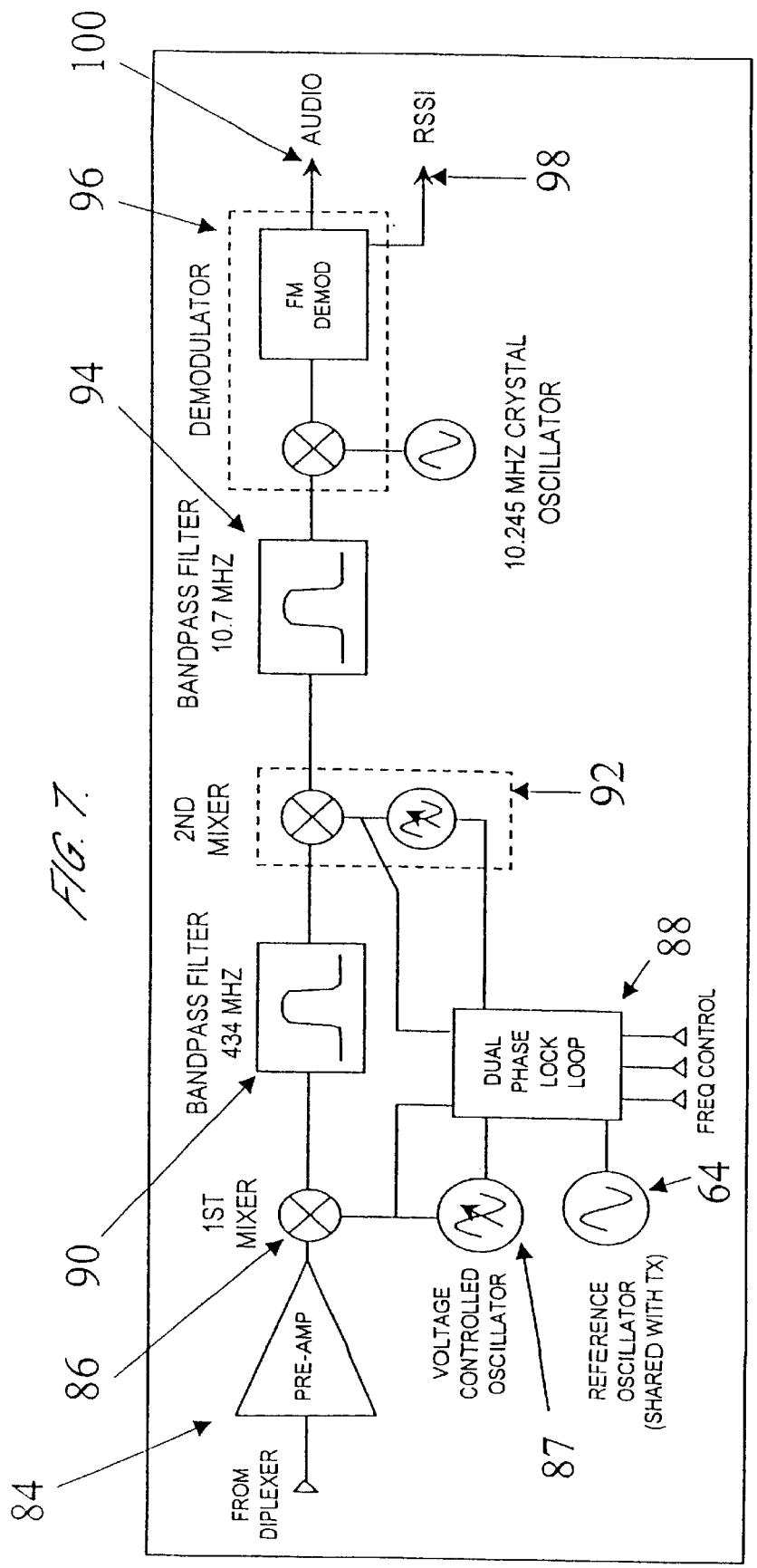
FIG. 7 is a block diagram of a preferred receiver.

Referring back to FIG. 5, the receiver 54 is shown as being in electrical communication with the microprocessor control circuit 50 and the diplexer 56. A block diagram of the internal functions of the receiver 54 is shown in FIG. 7. The received signal from the antenna head assembly 24 is provided to the receiver 54 by the diplexer 56. A particularly preferred receiver 54 design consists of two main down conversions in frequency prior to a 10.7 MHZ demodulator 96. The receive signal from the diplexer 56 is amplified by a pre-amp 84 prior to the first down conversion. The signal received from the diplexer 52 is then down converted to an intermediate frequency by a first mixer 86. The mixer 86 takes the received signal and combines it with a signal from the dual phase locked loop 88 to produce a modulated intermediate frequency signal. The intermediate frequency is preferably set to a frequency value that is slightly less than half the difference between the second and third harmonic frequencies. However, it will be readily appreciated by one skilled in the art that the present invention could be implemented with the intermediate frequency set to frequencies above or below the second or third harmonic frequencies as long as corresponding changes were made in the mixers and oscillators. The dual phase locked loop 88 in the receiver 54 shares a reference oscillator 64 with the transmitter 52 and provides the local oscillator for both down conversions. The first down conversion provides the capability to receive either the second or third harmonic signal. In order to receive an upper image of the second harmonic signal 16, the frequency of the voltage controlled oscillator 87 is set to a frequency slightly below an intermediate frequency that is between the frequency of the second harmonic signal 16 and the frequency of the third harmonic signal 18. To receive a lower image of the third harmonic signal 18, the voltage controlled oscillator 87 is set to a frequency slightly above the intermediate frequency between the second harmonic frequency and the third harmonic frequency. By toggling the frequency of the voltage controlled oscillator 87 between a frequency slightly above the intermediate frequency and a frequency slightly below the intermediate frequency, a single receiver 54 can be used to receive both the second 16 and third 18 harmonic signals. This is a significant improvement over the prior art in that it is less complex and expensive than an approach which utilizes a separate antenna or separate channels to receive both the second 16 and third 18 harmonic signals.

Alternative approaches to the above discussed preferred procedure for alternately receiving two harmonic signals with one receiver are contemplated by the present invention. One such approach would be to provide two oscillators each set to a different frequency and to alternately supply power to the oscillators depending upon the desired frequency to receive. It will be readily appreciated by one skilled in the art that additional modifications of the above discussed procedure are possible and are within the scope of the present invention.

A preferred method of searching for a non-linear junction consists of transmitting a continuous series of transmit pulses with the receiver 54 alternating between receiving the second 130 and third harmonics 132. The receiver 54 preferably alternates after each group of sixteen transmit pulses 134 as shown in FIG. 11. The received signal strength 136 is sampled during each time period when the transmitter is pulsed on and each time period when it is pulsed off. The samples are then integrated, or summed, into four groups. The first two groups respectively correspond to the signal strength received at the second and third harmonics when pulses are being transmitted. The second two groups respectively correspond to the ambient noise received at the second and third harmonics when no pulses are being transmitted. FIG. 11 shows the preferred timing for a complete second and third harmonic period. FIG. 12 shows an expanded view of the region 138. The received signal strength samples are taken at times 140 and 142. The noise samples are taken at times 144 and 146. Preferably, the following formula is used to convert the actual received signal strength for both the second and third harmonics into a bar graph display level.

$$IntRSSI = \sum_{n=1}^{RSSIInt} TxRSSI_n - \frac{\sum_{n=1}^{NoiseInt} NoiseRSSI_n}{NoiseInt} \times RSSIInt$$

Where IntRSSI is the integrated relative signal strength indicator value that is used for display purposes; RSSIInt is the number of samples taken when a pulse is being transmitted that are to be integrated; Noiseint is the number of samples taken when no pulse is being transmitted that are to be integrated; $NoiseRSSI_n$ is the received signal strength indicator value for the nth sample taken when no pulse was transmitted; and $TXRSSI_n$ is the average of four received signal strength indicator values received when a pulse was transmitted as given by the formula:

$$TxRSSI_n = \sum_{i=1}^{4} \frac{RSSI_i}{4}$$

Where $RSSI_i$ is the received signal strength indicator value for the ith sample taken when a pulse was transmitted.

The number of samples used to integrate the second and third harmonics is preferably a user selected value such as 8, 16, 24, 32, 48 or 64. The number of samples used to integrate out noise spikes is preferably much larger than the number of samples used to integrate the second and third harmonics. Preferably, the number of noise samples is 16,384.

The toggled receiver 54 that tunes to at least two harmonic frequencies can be used with either a pulsed transmission or a constant frequency wave non-linear junction detecting system. Furthermore, the receiver 54 can be toggled between the harmonic frequencies when no signals are being transmitted to measure the level of ambient noise present at the harmonic frequencies to determine if an alternative transmission frequency should be employed. The microprocessor control circuit 50 controls the frequencies between which the receiver toggles by sending control signals to the voltage controlled oscillator 87. These frequencies between which the receiver toggles may be automatically determined or manually controlled by the user. Thus, if too much ambient noise is present at the two frequencies, the microprocessor control circuit 50 can simply send control signals to the transmitter's voltage controlled oscillator 66 and the receiver's voltage controlled oscillator 87 that adjust the transmitter and receiver frequencies respectively. This digitally synthesized frequency control allows the non-linear junction detector 12 to alter its functioning to avoid noisy frequencies and comply with differing governmental regulations in different countries, and is a significant improvement over prior art non-linear junction detectors. Preferably, the ambient noise level received when no signal is transmitted is subtracted from the received signal level when a signal is transmitted to determine the portion of the received signal due to the re-radiated harmonics. In such an embodiment, the displayed received signal strength will not be substantially affected by the presence of ambient noise.

After the first down conversion, the mixed signal from the first mixer 86 is filtered by a bandpass filter 90 centered around the intermediate frequency of the first mixer 86. After the band pass filter 90, the mixed signal is sent to a second mixer 92. The mixer 92 in the second down conversion brings the mixed signal down to the 10.7 MHZ final intermediate frequency. The mixed signal is then passed through a second bandpass filter 94 that is centered around the intermediate frequency of the second mixer 92. The filtered signal is then frequency demodulated by a demodulator 96 to produce a received signal strength indicator output 98 that is read by an analog to digital converter in the microprocessor control circuit 50. The microprocessor control circuit 50 provides this information to the antenna head display 34. The demodulator 96 also produces an audio output 100 that can be used to provide audible signals representing the strength of the received harmonic signals 16 and 18.

As discussed above, in one embodiment of the present invention, the microprocessor control circuit 50 samples the received signal strength indicator output 98 and stores the sampled outputs. After a predetermined number of samples have been acquired the samples are summed or integrated. The resulting value is then sent to the antenna head display 34. Integrating or summing the sampled values increases the sensitivity of the displayed value to the received signal strength and makes it easier for a user to determine if a non-linear junction is present. For example, suppose the received signal strength indicator output 98 is sampled eight times and the following eight values are obtained (0, 0, 0, 2, 2, 2, 3, 3). If all eight sampled values are displayed as they are obtained on an LED type bar graph display 38, or 40 wherein each bar represents a sampled signal strength of one, the user will notice the bar graph display rise from a value of zero bars to three bars. Conversely, if the sampled values are integrated in groups of four, the first displayed value will be two bars, (0+0+0+2), and the second displayed value will be ten bars, (2+2+3+3). Thus, integrating the sampled values causes the display to be much more sensitive to changes in the sampled values. Therefore, integrating the sampled values allows a user to more easily detect small changes in the received signal strength. Since the samples are taken very rapidly, the update rate of the display is usually not noticeably affected. However, if the number of sampled values to be integrated is increased significantly, it may be necessary to slow down the physical movement of the non-linear junction detector to insure that a sufficient number of samples representing a non-linear junction will be received in each integration interval. Fortunately, the speed of modern electronics allows a very large number of samples to be integrated before the rate of physical movement of the non-linear junction detector over a surface to be scanned must be noticeably slowed. The number of samples to be integrated per display period may be manually set by a user or automatically set by the microprocessor control circuit 50.

In yet another embodiment of the present invention, the microprocessor control circuit 50 automatically reduces the power of the transmitted signal downward if the received signal strength indicator output 98 becomes saturated to the point that further increases in the received signal strength can not be detected. In addition, when the received signal strength indicator output 98 returns to a normal, unsaturated noise level, the microprocessor control circuit 50 automatically increases the transmitted signal power upward to the maximum level set by the user, or at least until the received signal strength indicator output increases above a baseline noise level. Automatically adjusting the transmit power level, in conjunction with varying the number of integrated sample values as discussed above, allows a user to observe the differences in the strengths of received harmonic signals without having to constantly adjust the transmit power.

As a further example of the functioning of the receiver 54 of FIG. 7, suppose the transmit frequency of the non-linear junction detector was set to 900 MHZ. The frequency of the received second harmonic signal 16 re-radiated by a non-linear junction would thus be 1800 MHZ and the frequency of the received third harmonic signal 18 would be 2700 MHZ. The intermediate frequency is set to a value that is equal to slightly less than half the difference between the second and third harmonic frequencies. In our example, the difference is 900 MHZ so the intermediate frequency would be set to about 435 MHZ which is slightly less than half the difference between the harmonic frequencies. To receive the second harmonic signal 16 the voltage controlled oscillator's 87 oscillation would be set to 2235 MHZ which is equal to the second harmonic frequency, 1800 MHZ, plus the intermediate frequency, 435 MHZ. To receive the third harmonic signal 18, the oscillation of the voltage controlled oscillator 87 is set to 2265 MHZ which is equal to the third harmonic frequency, 2700 MHZ, minus the intermediate frequency of 435 MHZ. Thus, by toggling the frequency of the oscillator 87, multiple signals at different frequency ranges can be received on a single receiver 54. The rate of toggling between frequencies is preferably rapid enough to make reception of the individual signals appear continuous to the user of the non-linear junction detector 12. While, the above discussion was limited to receiving signals from two frequency ranges, it is appreciated that the frequencies of the receiver 54 could be set to receive more than two signals including higher level harmonic frequencies, such as the fourth and fifth harmonics, of the transmitted signal.

Figure 8:
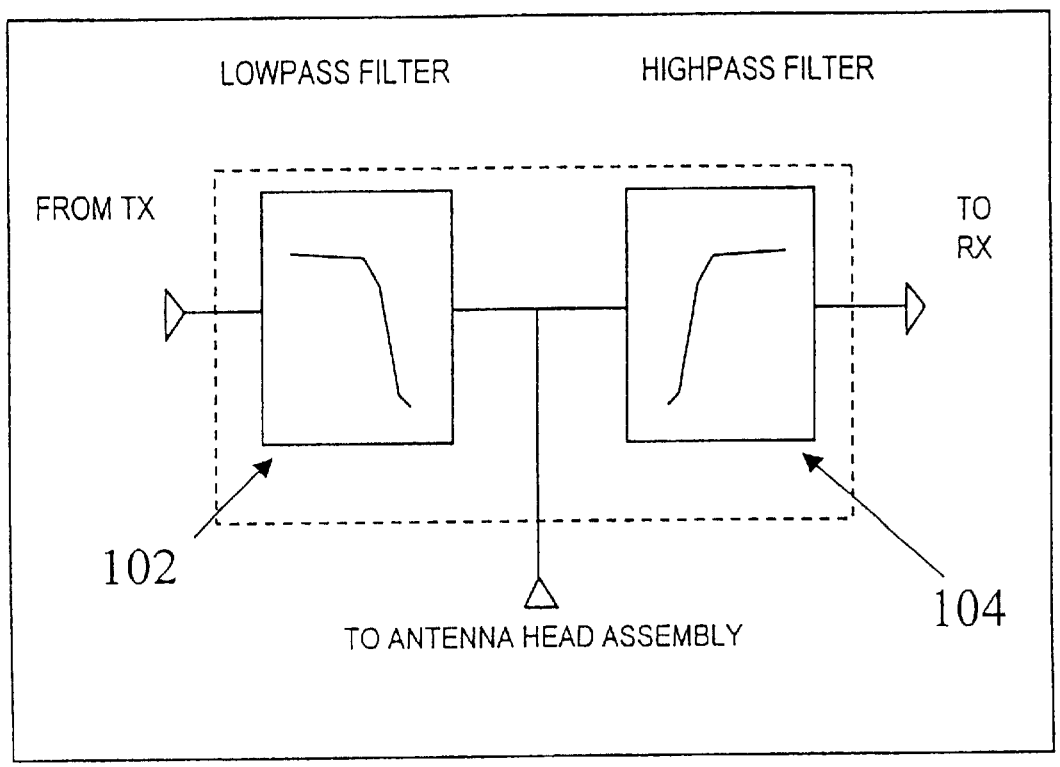
FIG. 8 is a block diagram of a preferred diplexer.

Referring now to FIG. 8, a block diagram of the diplexer 56 is depicted. The diplexer 56 performs the function of separating the transmit signal 14 from the receiver 54 so that a single cable and a single antenna design can perform all of the functions of the non-linear junction detector 12. The diplexer 56 preferably consists of a low pass filter 102 that prevents any harmonic signals being generated by the transmitter 52 from entering the electrically conductive cable 32 and interfering with the reception of the re-radiated harmonic signals 16 and 18 and a high pass filter 104 that prevents the relatively low frequency transmitted signal from entering the receiver 54. As discussed in more detail below, the DC power supply voltage 82 that is used to power the antenna head assembly 24 and the low frequency modulated serial commands that control the antenna head display 34 also pass through the low pass filter 102 and propagate toward the antenna head assembly 24.

Figure 9:
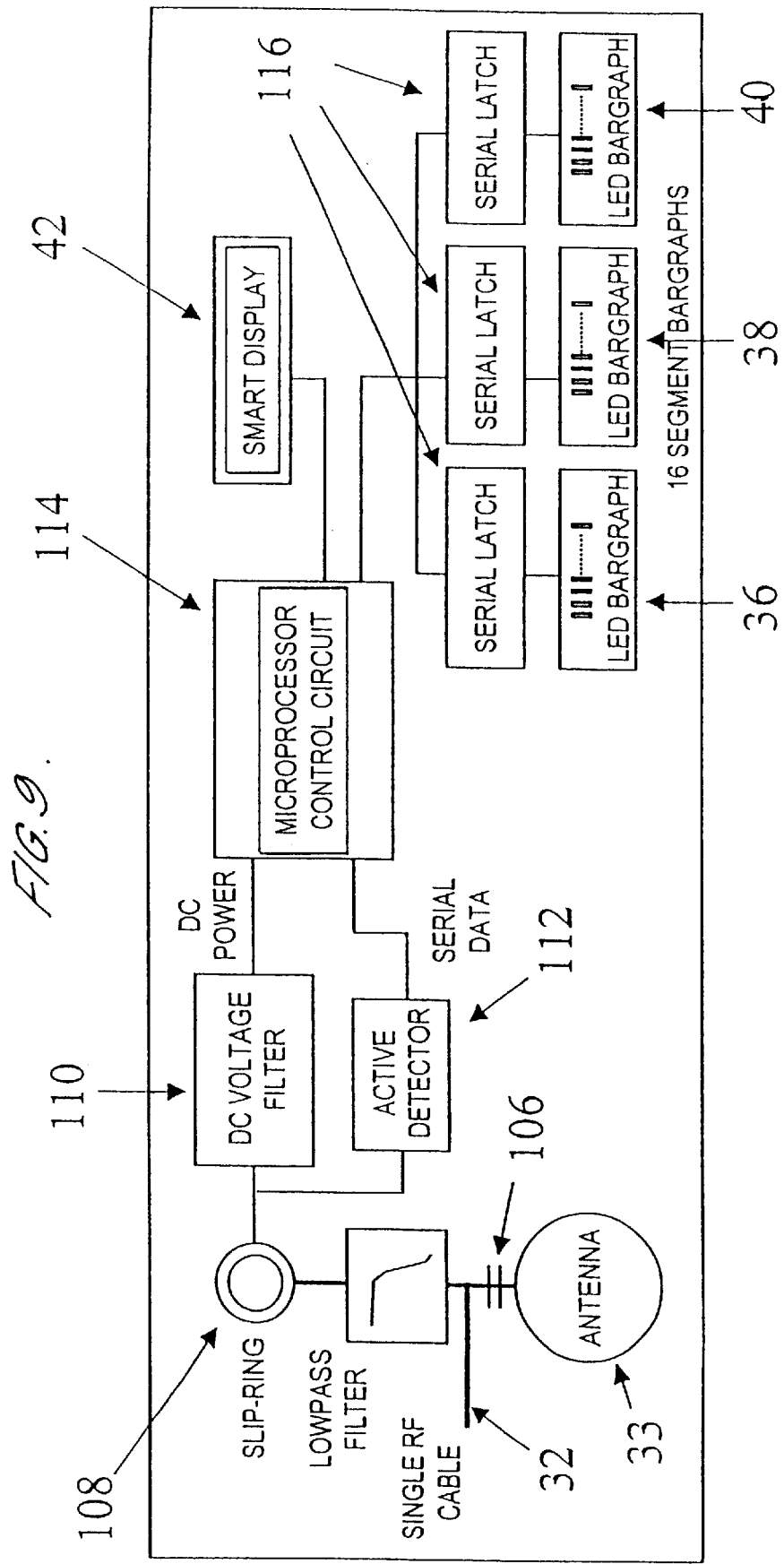
FIG. 9 is a block diagram of a preferred display and associated electronics.

A block diagram of the antenna head assembly 24 is shown in FIG. 9. The antenna head assembly 24 contains the antenna 33 and all the electronics needed for the antenna head display 34. A single electrically conductive cable 32 is connected to the antenna 33 through a coupling capacitor 106. The coupling capacitor 106 prevents the DC power supply voltage 82 and the low frequency serial commands for the antenna head display 34 from reaching the antenna 33. The single electrically conductive cable 32 is also connected directly to a slip ring 108. The slip ring 108 provides an electrical path between the electrically conductive cable 32 and the antenna head assembly 24 electronics. A DC voltage filter 110 is used to separate the DC power supply voltage 82 needed to power the display electronics. A low pass filter 112 is used to separate the low frequency serial commands used to control the display 42 from any high frequency signals received from the antenna 33. A second microprocessor control circuit 114 located in the antenna head assembly 24 interprets the serial commands and provides digital outputs for the eight character alphanumeric display 42 and the LED bar graphs 36, 38 and 40 of the antenna display 34. Serial latches 116 are used to form an interface between the second microprocessor control circuit 114 and the LED bar graphs 36, 38 and 40. The eight character alphanumeric display 42 is used to provide informational messages concerning the functioning of the non-linear junction detector 12 to the user of the detector 12. In one mode of operation, the bar graphs 36, 38 and 40 are used to display indications of the transmit power level, received second harmonic power level and received third harmonic level respectively. In another mode of operation, the red bar graph 38 is used to display the difference between the second and third harmonic levels, and the yellow bar graph 40 shows the normalized sum of the second and third harmonics. Bar graph 36 remains the same.

Figure 10:
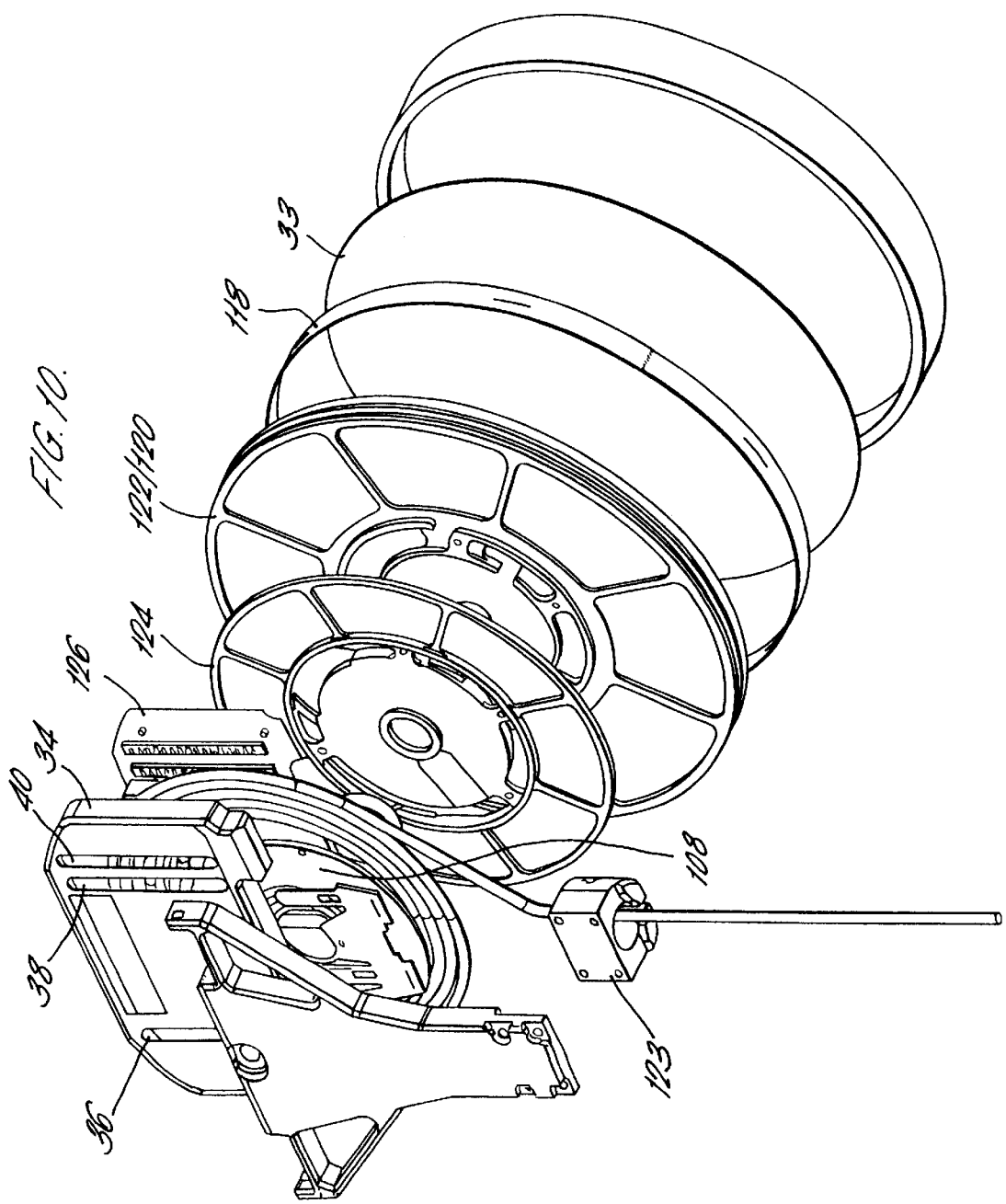
FIG. 10 is an exploded view of an antenna head assembly of a preferred embodiment.

An exploded view of a preferred embodiment of the antenna head assembly 24 is shown in FIG. 10. The antenna 33 is preferably a circularly polarized antenna that was designed by the University of Michigan and is disclosed in PCT application number PCT/US96/20500. The antenna 33 is held in place by a circular ring 118 that connects to the antenna back ground plane 120. The antenna back ground plane 120 is connected to the antenna side 122 of the cord winder. The cord winder has an antenna side 122 and a display side 124. The two sides of the cord winder 122 and 124 form a spool onto which the cord is wound. A spring biases the cord winder so that any slack in the electrically conductive cable 32 is immediately removed. A set of connectors and guides 123 remove and provide cord from the cord winder to the antenna extension assembly 22. A slip ring 108 fits between the display side 124 of the cord winder and the display head control board 126. As previously discussed, the slip ring 108 establishes an electrical path between the display 34 and the electrically conductive cable 32. The display 34 is connected to the display head control board 126. The display head control board 126 provides electrical contact between the slip ring 108 and the display 34 and secures the display 34 in place. The display 34 has three bar graphs 36, 38 and 40 that are preferably used to display the amplitudes of the transmitted signal 36, second harmonic signal 38 and third harmonic signal 40 respectively.

As can be appreciated from the preceding discussion, the provision of a non-linear junction detector 12 that uses a single circularly polarized antenna 33 is a significant improvement over the prior art. The retractable and extendable antenna extension assembly 22 allows the device to easily reach awkward areas where surveillance devices may be hidden. In addition, the collapsible structure and light weight of the non-linear junction detector allows it to be conveniently carried to remote locations. Furthermore, when the advanced electronic digital sampling and signal processing techniques of the present invention are used in conjunction with the circularly polarized transmit signals, the likelihood an electronic device will not be detected or falsely identified is substantially decreased. Many substantial improvements in the prior art are embodied in the present invention. Thus, while specific embodiments of the invention have been described with particularity above, it will be appreciated that the invention comprehends rearrangement and substitution of parts within the spirit of the appended claims.

What is claimed is:

1. A method of detecting the presence of a non-linear junction, the steps of the method comprising:
    transmitting a transmit signal at a transmit power level and a transmit frequency;
    receiving and sampling a second harmonic signal and a third harmonic signal that were re-radiated by a non-linear junction at harmonic frequencies of the transmitted signal with an analog-to-digital converter to produce sampled values;
    examining the sampled values to determine if a non-linear junction is present; and
    comparing the sampled values of the second and third harmonic signals to determine if a detected non-linear junction is formed by two dissimilar metals or a semiconductor.

2. The method of claim 1 wherein the step of transmitting a transmit signal further comprises transmitting a series of signal pulses.

3. The method of claim 1 further comprising automatically adjusting the transmit power level lower if the amplitude of the second harmonic signal and third harmonic signal received in response to the transmit signal exceed a predetermined allowable level and automatically adjusting the transmit power level higher if the amplitude of the second harmonic signal and third harmonic signal received in response to the transmit signal are below a predetermined allowable level.

4. The method of claim 2 wherein the series of transmitted signal pulses have a duty cycle and an amplitude such that the average power of the transmitted series of pulses is approximately equal to the maximum average transmit power allowed by law for a non-linear junction detector.

5. The method of claim 1 further comprising monitoring the harmonic frequency of the second harmonic signal and third harmonic signal without transmitting a transmit signal to determine if any ambient electronic noise exists at the harmonic frequencies and altering the frequency of the transmit signal if it is determined that the ambient electrical noise is above a predetermined level at one of the harmonic frequencies.

6. The method of claim 1 further comprising the steps of:
    selecting a plurality of possible transmitting frequencies at which the transmit signal may be transmitted;
    calculating harmonic frequencies corresponding to the plurality of possible transmitting frequencies;
    measuring an ambient noise level present at each of the calculated harmonic frequencies; and
    configuring the non-linear junction detector to transmit the transmit signal at the transmitting frequency corresponding to the harmonic frequency having the lowest measured ambient noise level.

7. The method of claim 1 further comprising displaying a signal strength of the received second harmonic signal and third harmonic signal on a display and calibrating the display such that ambient electrical noise is not included in the displayed signal strength.

8. The method of claim 2 wherein the series of transmitted signal pulses have a duty cycle and an amplitude that is selected to minimize power consumption and maximize the range at which a non-linear junction can be detected.

9. The method of claim 2 further comprising altering the frequency of the transmitted signal pulses to correspond to an allowable operational frequency band of the country in which the method of detecting non-linear junctions is being practiced.

10. The method of claim 1 wherein the transmit signal is circularly polarized and has the same polarization as the re-radiated harmonic signal and the opposite polarization of reflected components of the transmit signal.

11. The method of claim 1 further comprising the step of sampling the second harmonic signal and third harmonic signal at predetermined intervals to obtain a series of sampled values.

12. The method of claim 11 further comprising integrating a number of sample values to obtain an integrated sample value and displaying the integrated sample value.

13. The method of claim 12 wherein the number of sample values per integration is manually selected by a user or automatically selected by the non-linear junction detector.

14. The method of claim 1 further comprising increasing and decreasing the transmit power level of the transmit signal when a non-linear junction is detected and comparing the change in amplitude of the received harmonic signals to the change in the transmit power level to determine if the detected non-linear junction is a semi-conductor or dissimilar metal non-linear junction.

15. The method of claim 1 wherein the step of receiving a second harmonic signal and a third harmonic signal that were re-radiated by a non-linear junction at harmonic frequencies of the transmitted signal further comprises using a single receiver that alternates between receiving the second harmonic signal and third harmonic signal.

16. The method of claim 1 wherein the step of receiving a second harmonic signal and third harmonic signal comprises receiving a second and a third harmonic signal and producing audio signals representing amplitude levels of the second and third harmonics to provide a user of the method the ability to audibly discriminate between a sound representing a semi-conductor junction and a sound representing a junction of two dissimilar metals.

17. The method of claim 1 further comprising analyzing the second harmonic signal and third harmonic signal to produce digital data and comparing the digital data to stored digital data derived from known types of devices containing non-linear junctions to classify the type of device being detected.

18. The method of claim 1 wherein the second harmonic and third harmonic signal contain high frequency ultra-sonic clocking or synchronization signals from an electronic device reradiating harmonics of the transmit signal, further comprising the step of pulsing the transmit signal at a frequency that is high enough to downcovert the ultrasonic frequency clocking or synchronization signals into audible frequency range signals.

19. The method of claim 1 further comprising the step of indicating the presence of the second and third re-radiated harmonic signals when an amplitude of the re-radiated harmonic signals exceeds a user selectable threshold level.

20. A method of detecting a non-linear junction comprising:
   transmitting a transmit signal containing a modulated tone;
   receiving a second and a third harmonic signal in response to the transmitted signal;
   examining the second and third harmonic signals to determine if the modulated tone is present in the harmonic signals;
   indicating the presence of a non-linear junction if the modulated tone is detected in the harmonic signals; and
   comparing the second and third harmonic signals to determine if a detected non-linear junction is formed by two dissimilar metals or a semiconductor.

21. The method of claim 20 wherein the step of indicating the presence of a non-linear junction further comprises the step of producing an audible signal that represents the harmonic signals such that a user can listen to the audible signal and determine if the modulated tone is present in the at least one harmonic signal.

22. The method of claim 20 wherein the step of examining the second and third harmonic signals further comprises the step of digitally analyzing the second and third harmonic signals to determine in the modulated tone is present.

23. A method of detecting the presence of a non-linear junction, the steps of the method comprising:
   transmitting a transmit signal at more than one transmit power level;
   receiving the amplitude of at least a second and a third harmonic signal at a second and third harmonic frequency of the transmit signal that were re-radiated in response to the transmit signal being transmitted;
   examining the amplitudes of the harmonic signals received in response to the transmit signals being transmitted to determine if a non-linear junction has been detected; and
   comparing the relative amplitude levels of the second and third harmonic signals received at the different transmit power levels to discriminate between a non-linear junction formed by two dissimilar metals and a non-linear junction formed in a semiconductor.

24. The method of claim 23 further comprising comparing time and frequency domain waveforms of the harmonic signals re-radiated by a non-linear junction to time and frequency domain waveforms re-radiated by non-linear junctions in known types of electronic devices to determine if the harmonic signals were re-radiated by a non-linear junction in a known type of electronic device.

25. A method of detecting the presence of a non-linear junction, the steps of the method comprising:
   transmitting a first transmit signal having a first frequency;
   receiving first harmonic signals at harmonic frequencies of the first transmit signal;
   transmitting a second transmit signal having a second frequency;
   receiving second harmonic signals at harmonic frequencies of the second transmit signal;
   examining at least one of the first and the second harmonic signals to determine if a non-linear junction is present; and
   comparing the first and second harmonic signals to determine if a detected non-linear junction is formed by two dissimilar metals or a semiconductor.

* * * * *